United States Patent [19]
Toutonghi et al.

[11] Patent Number: 5,842,016
[45] Date of Patent: Nov. 24, 1998

[54] THREAD SYNCHRONIZATION IN A GARBAGE-COLLECTED SYSTEM USING EXECUTION BARRIERS

[75] Inventors: Michael Toutonghi, Seattle; Peter Kukol, Monroe; Frank Peschel-Gallee, Redmond; Patrick Dussud, Bellevue, all of Wash.

[73] Assignee: Microsoft Corporation, Redmond, Wash.

[21] Appl. No.: 864,759

[22] Filed: May 29, 1997

[51] Int. Cl.$^6$ .............................. G06F 12/02; G06F 9/40
[52] U.S. Cl. ......................... 395/676; 707/206; 711/165
[58] Field of Search ........................ 707/206; 395/676, 395/670; 711/165

[56] References Cited

U.S. PATENT DOCUMENTS

| | | | |
|---|---|---|---|
| 5,088,036 | 2/1992 | Ellis et al. | 707/206 |
| 5,355,483 | 10/1994 | Serlet | 711/154 |
| 5,485,613 | 1/1996 | Engelstad et al. | 707/206 |
| 5,560,003 | 9/1996 | Nilsen et al. | 707/206 |
| 5,692,193 | 11/1997 | Jagannathan et al. | 395/676 |
| 5,701,470 | 12/1997 | Joy et al. | 707/103 |
| 5,706,515 | 1/1998 | Connelly et al. | 395/676 |

OTHER PUBLICATIONS

Wolfgang W. Kuechlin et al., "On Multi–Threaded List–Processing and Garbage Collection," Proceedings on Parallel and Distributed Processing, pp. 894–897, ©IEEE, 1991.

*Primary Examiner*—Paul V. Kulik
*Attorney, Agent, or Firm*—Seed and Berry LLP

[57] ABSTRACT

The present invention synchronizes threads in a garbage-collected system. In accordance with the invention, each thread may enable or disable garbage collection. A synchronization facility receives a request to initiate garbage collection. In response to the request, the facility identifies threads that have enabled garbage collection more recently than they have disabled garbage collection. Then, until all of the threads are identified or suspended, the facility identifies threads that enable garbage collection and suspends threads that disable garbage collection. When all threads are identified or suspended, the facility performs garbage collection. The facility also suspends any identified threads that attempt to disable garbage collection during the performance of garbage collection.

36 Claims, 28 Drawing Sheets facility-compliant program 2700

```
1   {
2       IncrementDisableGCCount( );
3       reference-accessing steps
4
5
6
7       DecrementDisableGCCount( );
8       SaveAndZeroDisableGCCount( );
9       steps not accessing
10      references
11
12
13      RestoreDisableGCCount( );
14  }
```

*Fig. 27*

THREAD SYNCHRONIZATION IN A GARBAGE-COLLECTED SYSTEM USING EXECUTION BARRIERS

TECHNICAL FIELD

The invention relates generally to the field of memory management in a computer system, and, more specifically, to the field of garbage collection.

BACKGROUND OF THE INVENTION

Computer memories are typically used to store chunks of data, such as variables and data structures, collectively termed "objects" herein. Objects may be allocated—ie., memory may be reserved for objects—either statically or dynamically. An object that is allocated statically is associated with a particular program, and is guaranteed to be allocated while the program is executing. A statically allocated object is therefore automatically allocated when its program begins executing and automatically deallocated when execution of the program concludes. A dynamically allocated object, on the other hand, is explicitly allocated by a program at a point during the execution of the program. Programs written in languages such as C++ and Java use a "new" operator to dynamically allocate an object. Programs often allocate objects dynamically when those objects are not always needed for every execution of the program, or when they are not needed for the entire time the program is executing.

Several approaches are used to deallocate dynamically allocated objects that are no longer in use. In a first, explicit deallocation approach, objects no longer in use must be explicitly deallocated by a program, either the allocating program or another program to which the allocating program has delegated that responsibility. In a typical implementation of the explicit deallocation approach, memory occupied by objects no longer in use that is not explicitly deallocated can never be reclaimed.

In a second, garbage collection approach, the computer system periodically examines all active pointers to identify objects to which no pointers refer, and which are therefore not in use. The computer system then deallocates these "dead" objects in order to reclaim the memory that they occupy. The garbage collection approach to deallocating dynamically allocated object is utilized in several programming languages, including Java.

Garbage collection systems generally identify dead objects by analyzing the contents of all active pointers to determine the reachability of each object from the pointers. If the number or content of pointers is permitted to change during this analysis, the result of the analysis may be invalid, which in turn may make garbage collection impossible to complete, or at least may cause objects that are not dead to be incorrectly identified as dead and deallocated. Conventional garbage collection systems therefore typically employ some technique to ensure that the number and content of pointers is fixed during the analysis process. These techniques are herein collectively termed "synchronization techniques," as they operate to synchronize garbage collection analysis with the operations of changing the number or content of pointers.

Conventional synchronization techniques include wholesale thread suspension and controlling pointer reading and writing. Wholesale thread suspension refers to suspending, or "blocking" the execution of every thread of execution that is capable of changing the number or contents of pointers for the entire duration of the analysis process. Wholesale thread suspension has the disadvantages that (A) suspending a thread performing an urgent task such as synchronous input/output for the entire duration of the analysis process may prevent the urgent task from being successfully completed, and (B) suspending all of the threads prevents the computer system from making any progress on tasks other than garbage collection. On the other hand, by controlling all pointer reading and writing, the computer system can prevent changes to the number and contents of pointers by deferring attempted pointer reading and writing operations during the analysis process until the analysis process has concluded, while allowing each thread to run until it attempts to read from or write to a pointer. Controlling all pointer reading and writing, however, adds significant overhead to all attempts to read from or write to a pointer. Each time a thread attempts to read from or write to a pointer, the mechanism for pointer reading and writing must determine whether garbage collection analysis is in progress. Because this determination requires processing resources, and because pointer reading and writing occurs frequently, controlling pointer reading and writing often has a negative impact on processing performance, especially when garbage collection analysis is not in progress.

Given the disadvantages of conventional synchronization techniques, a technique that synchronizes garbage collection analysis with the operations of changing the number or content of pointers, while not suspending all threads or imposing a significant overhead on pointer reading and writing operations, would have significant utility.

SUMMARY OF THE INVENTION

The present invention is directed to an efficient approach to synchronizing garbage collection with the execution of other threads. Unlike conventional approaches to garbage collection that suspend execution of all other threads in the system for the duration of garbage collection, the invention suspends the execution of threads for a substantial period only when they attempt to execute sections of code that access references to objects during garbage collection. In this way, thread suspension across all threads is minimized, therefore minimizing the negative impact of garbage collection on overall system performance. Further, urgent programs may be coded so that threads executing them will never be suspended during garbage collection, thus ensuring that such urgent programs may execute unhampered by garbage collection.

In accordance with the invention, each program that accesses references to objects designates the sections of its code that reference objects by inserting a call to a DisableGarbageCollection API before such "reference-accessing" sections and inserting a call to an EnableGarbageCollection API after reference-accessing sections. The EnableGarbageCollection API ensures that, once garbage collection is initiated, garbage collection is not actually performed until each reference-accessing section currently being executed by a thread has been exited. The DisableGarbageCollection API ensures that no reference-accessing section is entered while garbage collection is in progress. As a result, only threads that attempt to execute reference-accessing sections after garbage collection has begun are suspended, thereby ensuring more satisfactory system performance during garbage collection.

The invention is preferably also able to suspend certain kinds of programs, such as just-in-time-compiled Java programs, to perform garbage collection, so that the commencement of garbage collection need not wait until these programs have exited their reference-accessing sections. These suspensions are facilitated by maintaining a list of interruptible address ranges, compiling tests for garbage collection into these programs at key points, and by patching call returns within these programs.

BRIEF DESCRIPTION OF THE DRAWINGS

FIG. 27 is a code diagram showing the insertion of disable counting API calls into a program.

DETAILED DESCRIPTION OF THE INVENTION

The present invention provides thread synchronization in a garbage-collected system using execution barriers. In a preferred embodiment, a garbage collection synchronization software facility ("the facility") suspends the execution of threads for a substantial period only when they attempt to execute sections of code that access references to objects during garbage collection. Such "reference-accessing" code sections are identified using "execution barriers"—pairs of API calls that each mark the beginning and end of a reference-accessing section. In this way, thread suspension across all threads is minimized, therefore minimizing the negative impact of garbage collection on overall system performance. Further, urgent programs may be coded so that threads executing them will never be suspended during garbage collection, thus ensuring that such urgent programs may execute unhampered by garbage collection.

The facility provides four application programming interfaces ("APIs") for synchronizing the garbage collection process with the execution of other threads. Each program that accesses references to objects calls a DisableGarbageCollection API immediately before each group of reference-accessing steps. If garbage collection is not in progress when the DisableGarbageCollection API is called, the DisableGarbageCollection API returns immediately to allow the thread to execute the reference-accessing steps. If, on the other hand, garbage collection is in progress when the DisableGarbageCollection API is called, the DisableGarbageCollection API does not return immediately, but rather waits until garbage collection is finished before returning. The DisableGarbageCollection API thereby defers the execution of reference-accessing steps until the garbage collection process is finished. When a program finishes executing a reference-accessing section, it calls an EnableGarbageCollection API. If the garbage collection system has been waiting for the thread executing this program to finish executing the current reference-accessing section, then the performance of garbage collection can proceed in response to this call to the EnableGarbageCollection API. The function returns immediately so the thread can continue its execution.

When garbage collection is initiated, the garbage collection system calls a StartGarbageCollection function in order to synchronize the garbage collection system with the execution of other threads. When the StartGarbageCollection function returns, the garbage collection system may proceed to actually perform garbage collection. When the garbage collection system finishes performing garbage collection, it calls an EndGarbageCollection function. The EndGarbageCollection function permits threads waiting to execute reference-accessing steps to proceed.

Figure 1:
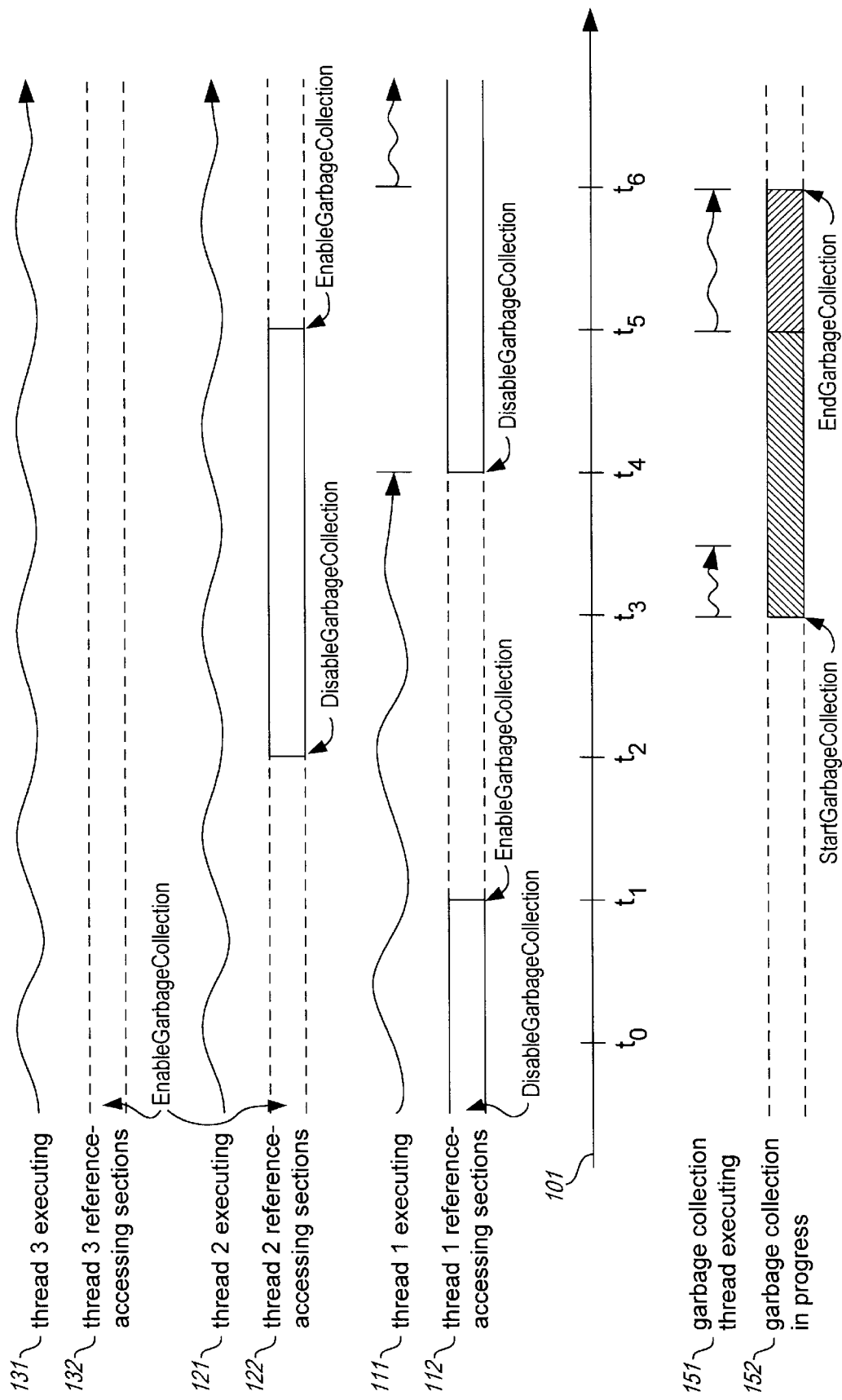
FIG. 1 is a timing diagram showing the facility synchronizing garbage collection with the execution of other threads.

FIG. 1 is a timing diagram showing the facility synchronizing garbage collection with the execution of other threads. While the timing diagram shows the simultaneous execution of several threads at some points, those skilled in the art will appreciate that, in a single-processor multi-threaded system, this merely means that each of the threads is unblocked and eligible to execute, in that a single-processor system may only actually execute one thread at a time.

The timing diagram is indexed by timeline 101, which shows times $t_0$ through $t_6$. Rows 111, 121, 123 show the execution and suspension of threads 1, 2, and 3, respectively. Rows 112, 122, and 123 show when threads 1, 2, and 3, respectively, execute reference-accessing sections in which references to garbage-collected objects are accessed. Row 151 shows whether the garbage collection thread is executing, and row 152 shows whether the garbage collection process is in progress.

From the solid bar in row 112 at time $t_0$, it can be seen that thread 1 is executing a reference-accessing section at time $t_0$. As such, thread 1 has called the DisableGarbageCollection API at a time before time $t_0$. On the other hand, it can be seen by the dashed bars in rows 122 and 132 at time $t_0$ that threads 2 and 3 are not executing reference-accessing sections at time $t_0$. As such, threads 2 and 3 called the EnableGarbageCollection API at a time before time $t_0$. It can further be seen from the wavy arrows in rows 111, 121, and 131 at time $t_0$ that threads 1, 2, and 3 are all executing at time $t_0$. It can further be seen from the dotted bar in row 152 at time $t_0$ that the garbage collection process is not in progress at time $t_0$. It can also be seen from the absence of a wavy line in row 151 at time $t_0$ that the garbage collection thread is not executing at time $t_0$.

At time $t_1$, thread 1 exits its current reference-accessing section and calls the EnableGarbageCollection API. The EnableGarbageCollection API returns immediately.

At time $t_2$, thread 2 reaches the beginning of a reference-accessing section and calls the DisableGarbageCollection API. The DisableGarbageCollection API checks to see whether garbage collection is in progress. Because garbage collection is not yet in progress at time $t_2$, the DisableGarbageCollection API returns immediately to allow thread 2 to begin executing its reference-accessing section.

At time $t_3$, the garbage collection process is initiated by calling the StartGarbageCollection function in the garbage collection thread, which has begun executing. The StartGarbageCollection function determines whether any of the threads is currently executing a reference-accessing section. The StartGarbageCollection function determines that thread 2 is executing a reference-accessing section, as it has called the DisableGarbageCollection API more recently than it has called the EnableGarbageCollection API. At a time between time $t_3$ and time $t_4$, therefore, the StartGarbageCollection function suspends the garbage collection thread from execution by waiting until thread 2 calls the EnableGarbageCollection API.

At time $t_4$, before thread 2 calls the EnableGarbageCollection API, thread 1 calls the DisableGarbageCollection API. Because garbage collection is in progress, the DisableGarbageCollection API does not return immediately, but rather suspends thread 1 from execution by waiting until the EndGarbageCollection function is called and garbage collection is no longer in progress.

At time $t_5$, thread 2 finishes executing its reference-accessing section and calls the EnableGarbageCollection API. The EnableGarbageCollection API returns immediately, and the garbage collection thread is unsuspended because it is finished waiting for the EnableGarbageCollection API call by thread 2. From time $t_5$ until time $t_6$, the garbage collection system actually performs garbage collection.

At time $t_6$, when the performance of garbage collection concludes, the garbage collection system calls the EndGarbageCollection function. In response, thread 1 resumes execution, as it is finished waiting for the end garbage collection call. At time $t_6$, thread 1 therefore begins executing its new reference-accessing section.

It can be noted from FIG. 1 that the only other thread ever suspended for a substantial period was thread 1, which attempted to execute a reference-accessing section while garbage collection was in progress. Thread 2 began executing its reference-accessing section before garbage collection began, and therefore was allowed to finish executing its reference-accessing section before garbage collection was actually performed. Thread 3 never executed a reference-accessing section, and therefore was allowed to generally run uninterrupted.

The invention is preferably also able to suspend certain kinds of programs, such as just-in-time-compiled Java programs, to perform garbage collection, so that the commencement of garbage collection need not wait until these programs have exited their reference-accessing sections. As is described further below, these suspensions are facilitated by maintaining a list of address ranges in which programs are interruptible, compiling tests for garbage collection into these programs at key points, and by patching call returns within these programs.

Figure 2:
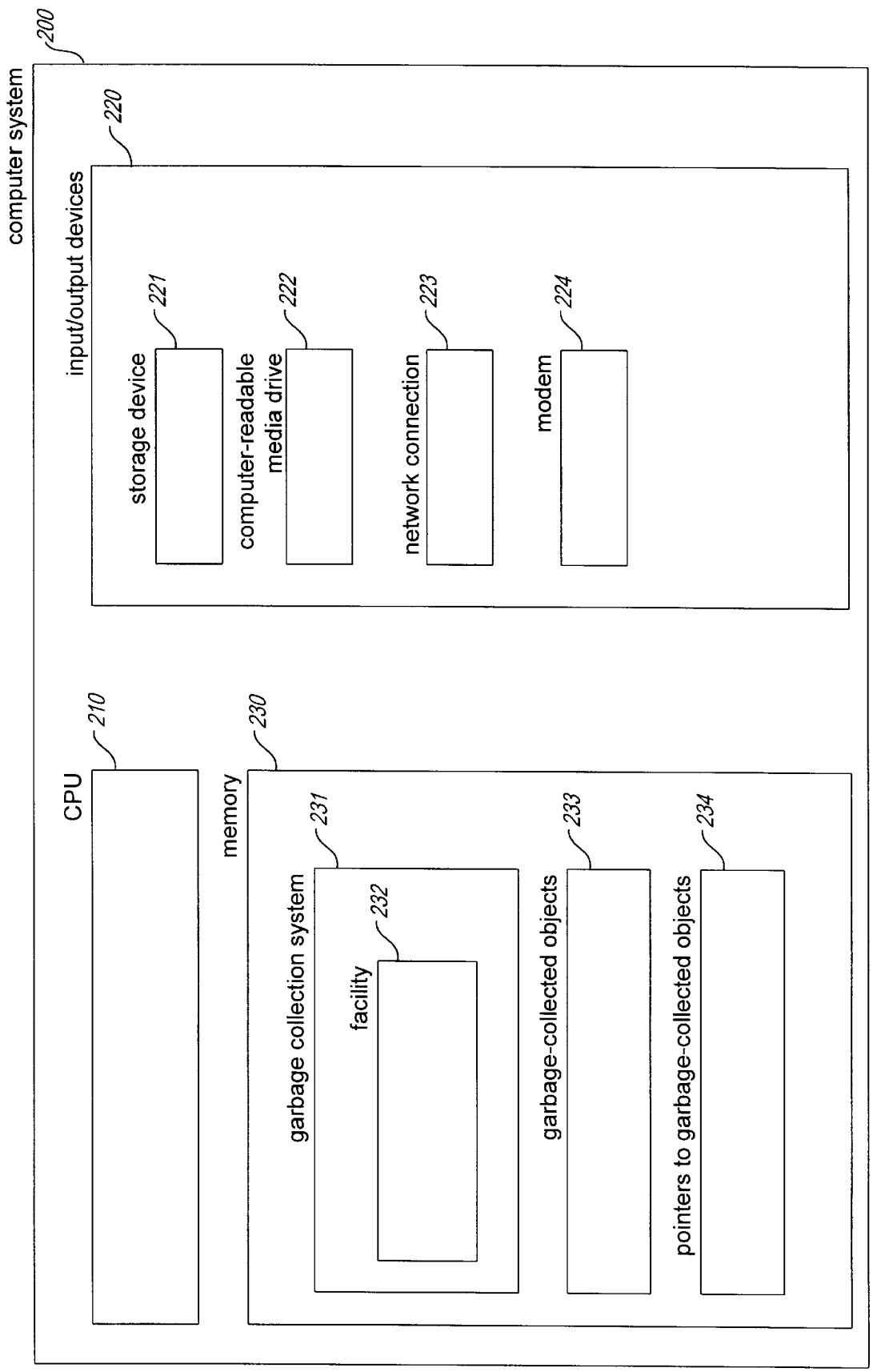
FIG. 2 is a high-level block diagram of the general-purpose computer system upon which the facility preferably executes.

FIG. 2 is a high-level block diagram of the general-purpose computer system upon which the facility preferably executes. The computer system 200 contains one or more central processing units (CPUs) 210, input/output devices 220, and a computer memory (memory) 230. Among the input/output devices is a storage device 221, such as a hard disk drive; a computer-readable media drive 222, which can be used to install software products, including the facility, which are provided on a computer-readable medium, such as a CD-ROM; and a network connection 223 and a modem 224, through which the computer system 200 may communicate with other connected computer systems (not shown). The memory 230 preferably contains a garbage collection system 231, which in turn contains the facility 232 for synchronizing the operation of the garbage collection system with the execution of other threads. The memory 230 preferably also contains a number of garbage-collected objects 233, and a number of pointers to garbage-collected objects 234. While the facility is preferably implemented on a computer system configured as described above, those skilled in the art will recognize that it may also be implemented on computer systems having different configurations.

Figure 3:
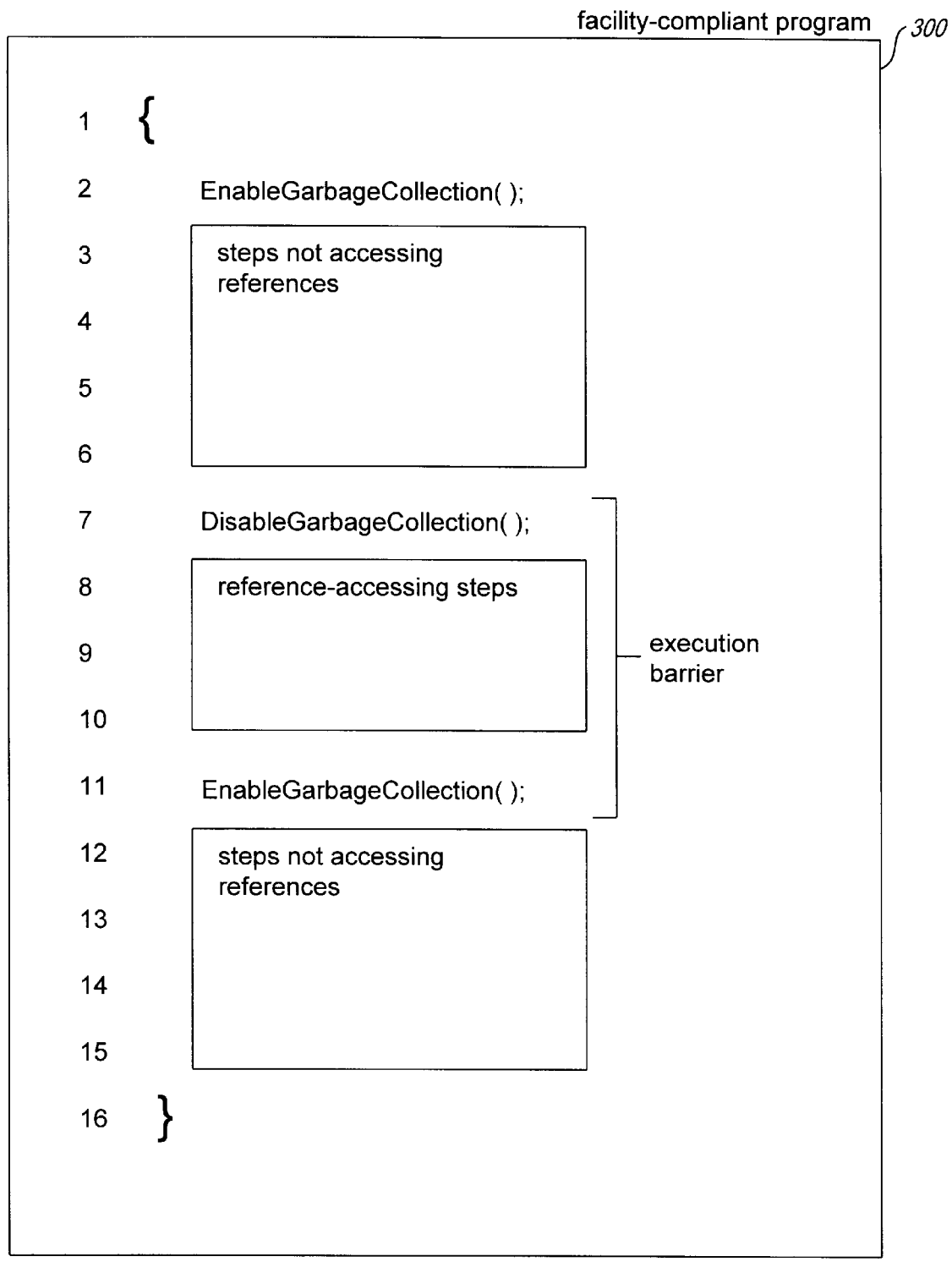
FIG. 3 is a code diagram showing the insertion of API calls into a program.

As already described, the facility relies on the programs being executed by threads other than the garbage collection thread to call the DisableGarbageCollection and EnableGarbageCollection APIs in order to establish an execution barrier identifying reference-accessing code sections. FIG. 3 is a code diagram showing the insertion of calls to the DisableGarbageCollection and EnableGarbageCollection APIs into a program. This diagram shows the insertion of such calls at the source code level, either manually by the developer or automatically by an automated tool. These calls may also preferably be inserted later in the compiling and linking process.

The facility-compliant program 300 comprises lines 1–16, and contains a reference-accessing section at lines 8–10. It can be seen that an execution barrier has been established around the reference-accessing section by inserting a call to the DisableGarbageCollection API at line 7 and inserting a call to the EnableGarbageCollection API at line 11. The call to the DisableGarbageCollection API on line 7 will return and allow execution of the reference-accessing section only when garbage collection is not in progress, thus preventing the reference-accessing section from being executed during garbage collection.

The facility-compliant program further comprises sections not accessing references at lines 3–6 and lines 12–15. Each of these sections is preferably preceded by a call to the EnableGarbageCollection API, so that these steps not accessing references can execute concurrently with garbage collection. In one embodiment, before calling the EnableGarbageCollection API, the program includes additional steps to register pointers used by the program with the garbage collection system so that, if the garbage collection system performs garbage collection during the execution of the steps not accessing references, the garbage collection system is apprised of all of the pointers used by the program.

The EnableGarbageCollection and DisableGarbageCollection APIs shown represent garbage collection enablement and disablement as a simple binary state. In cases in which programs call each other, however, a more extensive state is preferably used to track the correct condition of garbage collection enablement and disablement during the execution of multiple programs. This more extensive state and APIs that utilize it are discussed further below.

Figure 4:
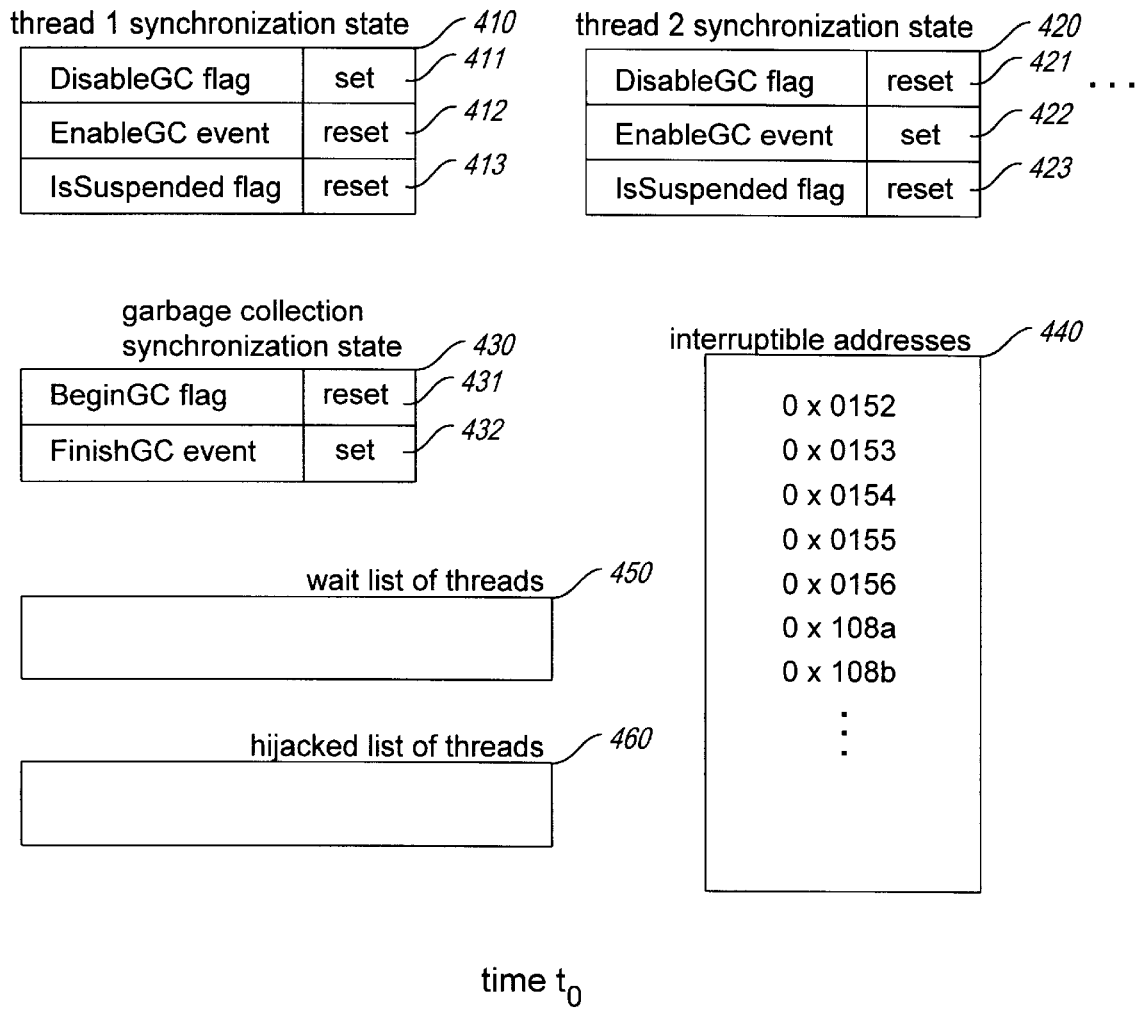
FIG. 4 is a state diagram showing the internal state of the facility at time $t_0$.

FIGS. 4–11 show the operation of the facility to synchronize the garbage collection process with execution of other threads, including the internal state maintained by the facility. FIG. 4 is a state diagram showing the internal state of the facility at time $t_0$. The state of the facility includes a synchronization state for each thread (e.g., 410 and 420), a garbage collection synchronization state 430, a list of addresses at which programs are interruptible by the facility 440 (discussed further below), a "wait list" of threads 450 that must each exit reference-accessing sections before garbage collection may be performed, and a "hijacked list" of threads 460 that have been "hijacked" (discussed further below). Each thread synchronization state comprises a DisableGC flag and EnableGC event and an IsSuspended flag. The DisableGC flag and EnableGC event indicate whether the thread has more recently enabled or disabled garbage collection. The DisableGC flag is a flag that may have two states: "set" and "reset." The DisableGC flag is set by the DisableGarbageCollection API, and is reset by the EnableGarbageCollection API. The DisableGC flag may be checked to determine whether garbage collection is presently disabled for this thread. The EnableGC event is an event that also has the same two states, "set" and "reset." The EnableGC event is set when the thread calls the EnableGarbageCollection API, and is reset when the thread calls the DisableGarbageCollection API. Threads may wait for the EnableGC event to be set. If the EnableGC event is set when a thread waits on it, then the thread continues executing immediately. On the other hand, if the EnableGC event is reset when a thread waits on it, the waiting thread will be suspended from execution until the EnableGC event is set. In particular, in the StartGarbageCollection function, the garbage collection thread waits on the EnableGC event of threads that have disabled garbage collection, thus ensuring that garbage collection does not proceed until all of these threads have set their EnableGC events. It can be seen from the thread 1 synchronization state in the thread 2 synchronization state that, at time to, garbage collection is disabled for thread 1 and enabled for thread 2. The IsSuspended flag is discussed further below.

The garbage collection synchronization state 430 is made up of a BeginGC flag and a FinishGC event. The BeginGC flag is set when garbage collection begins and reset when garbage collection is finished, while the FinishGC event is reset when garbage collection begins, and is set when garbage collection finishes. That is, the BeginGC flag is set by the StartGarbageCollection function and reset by the EndGarbageCollection function, while the FinishGC flag is set by the EndGarbageCollection function and reset by the StartGarbageCollection function. The DisableGarbageCollection API waits on the finished garbage collection event, so that threads do not proceed to execute reference-accessing sections while garbage collection is in progress. It can be seen from the garbage collection synchronization state 430 that garbage collection is not in progress at time $t_0$. A wait list of threads 450 is used by the facility to keep track of the threads on whose EnableGC events the facility must wait before performing garbage collection.

Figure 5:
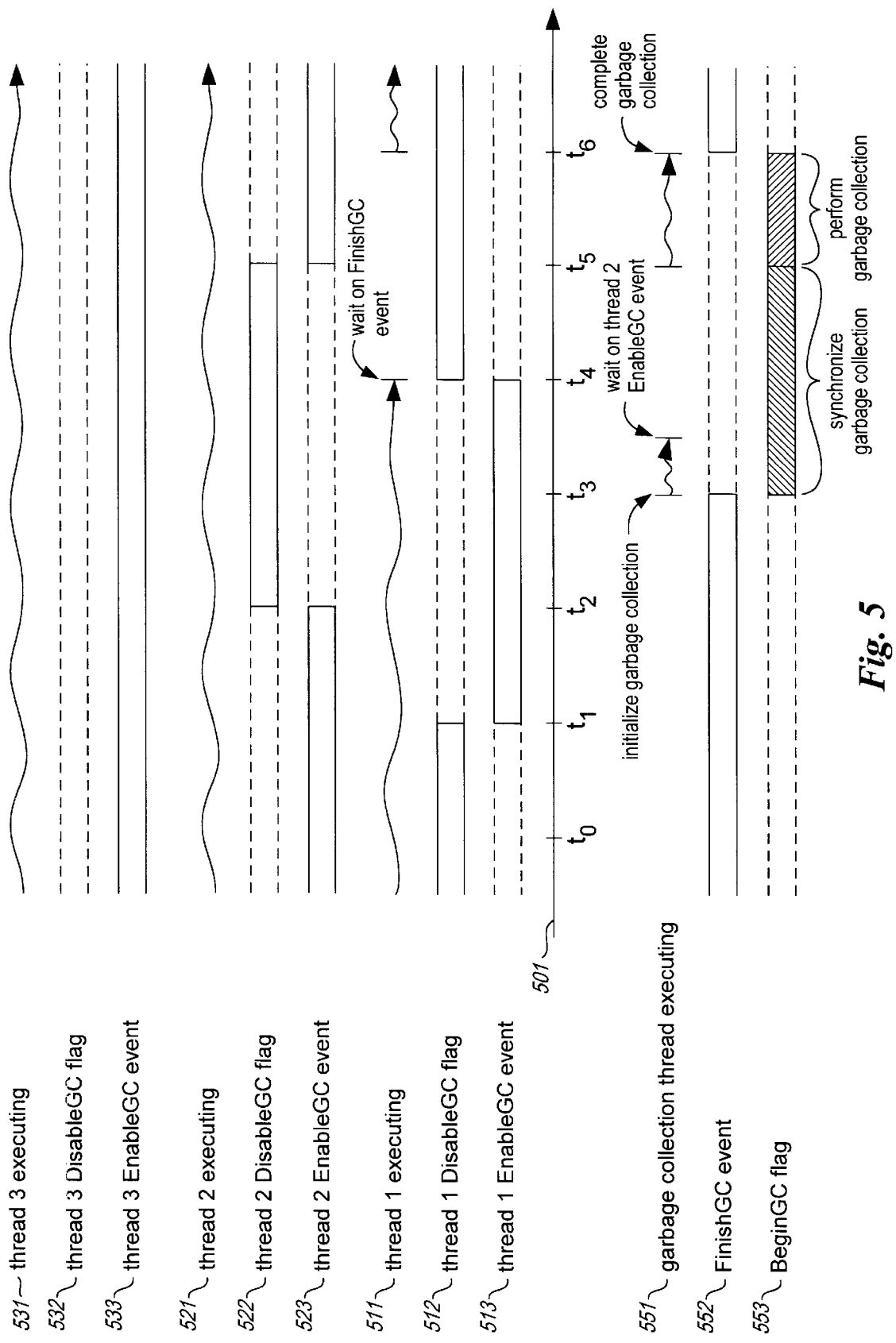
FIG. 5 is a timing diagram showing the initial state of the facility as it synchronizes the garbage collection process with the execution of other threads.
Figure 6:
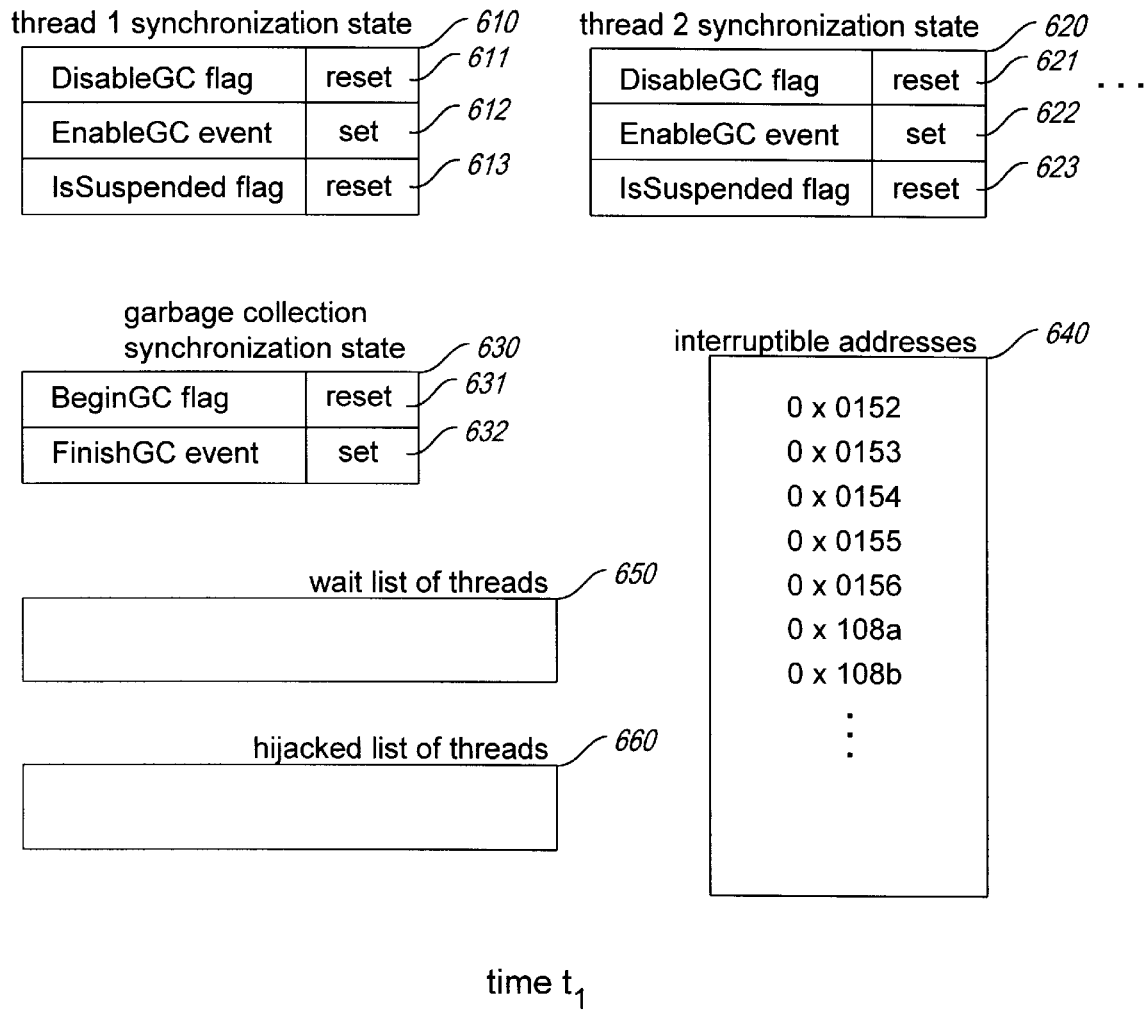
FIG. 6 is a state diagram showing the internal state of the facility at time $t_1$.

FIG. 5 is a timing diagram showing the initial state of the facility as it synchronizes the garbage collection process with the execution of other threads. The timing diagram is indexed by a timeline 501, showing times $t_0$ through $t_6$. The state of the facility at time $t_0$ is shown in FIG. 4, while the state of the facility at times $t_1$–$t_6$ is shown in FIGS. 6–13, respectively. At time $t_0$, garbage collection is disabled for thread 1 and enabled for threads 2 and 3. At time $t_1$, thread 1 calls the EnableGarbageCollection API. As shown in FIGS. 5 and 6, the facility resets the DisableGC flag and sets the EnableGC event for thread 1 in the EnableGarbageCollection API.

Figure 7:
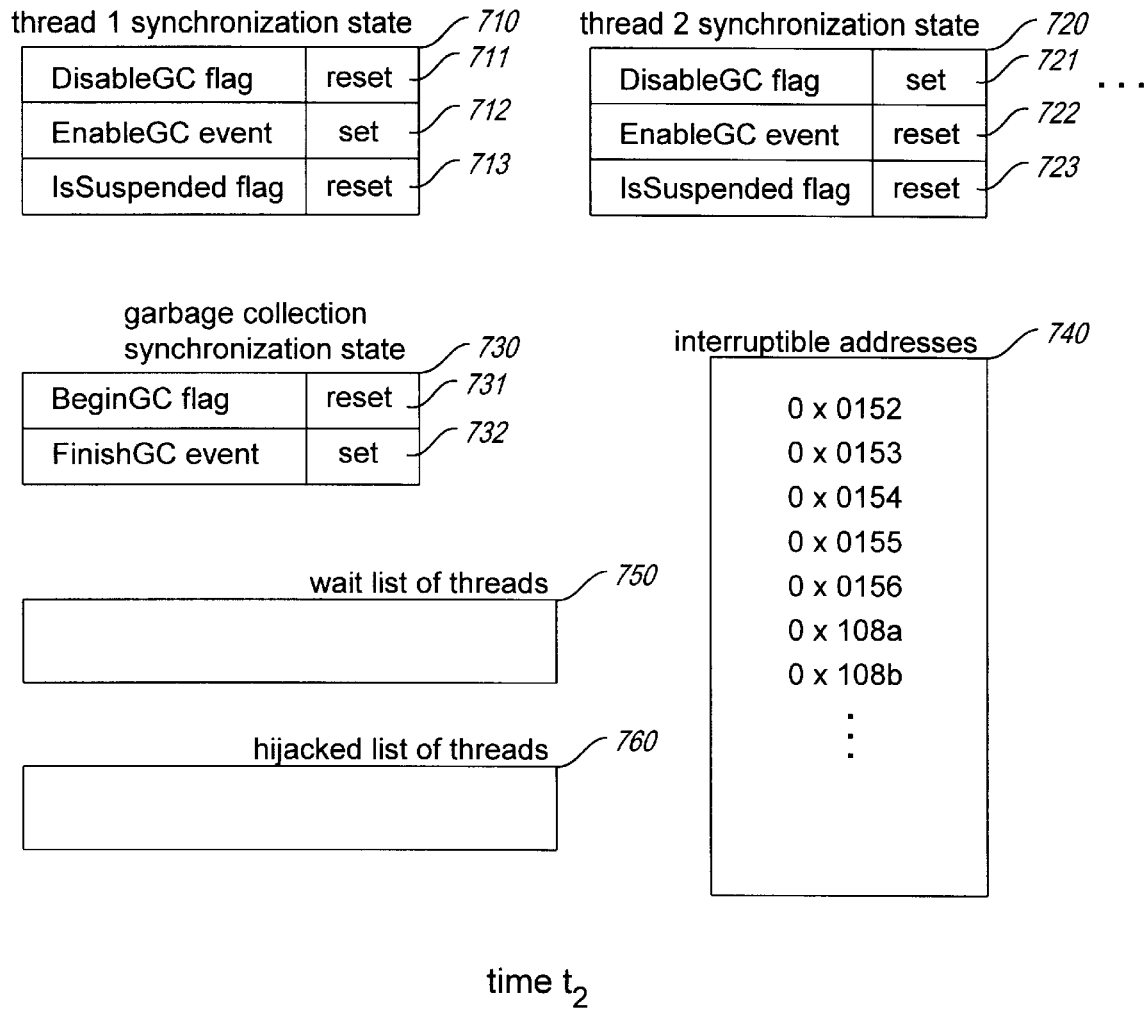
FIG. 7 is a state diagram showing the internal state of the facility at time $t_2$.

At time $t_2$, thread 2 calls the DisableGarbageCollection API. As shown in FIGS. 5 and 7, the facility sets the DisableGC flag and resets the EnableGC event for thread 2 in the DisableGarbageCollection API. Because the BeginGC flag is reset, the DisableGarbageCollection API returns immediately to allow thread 2 to continue executing.

Figure 8:
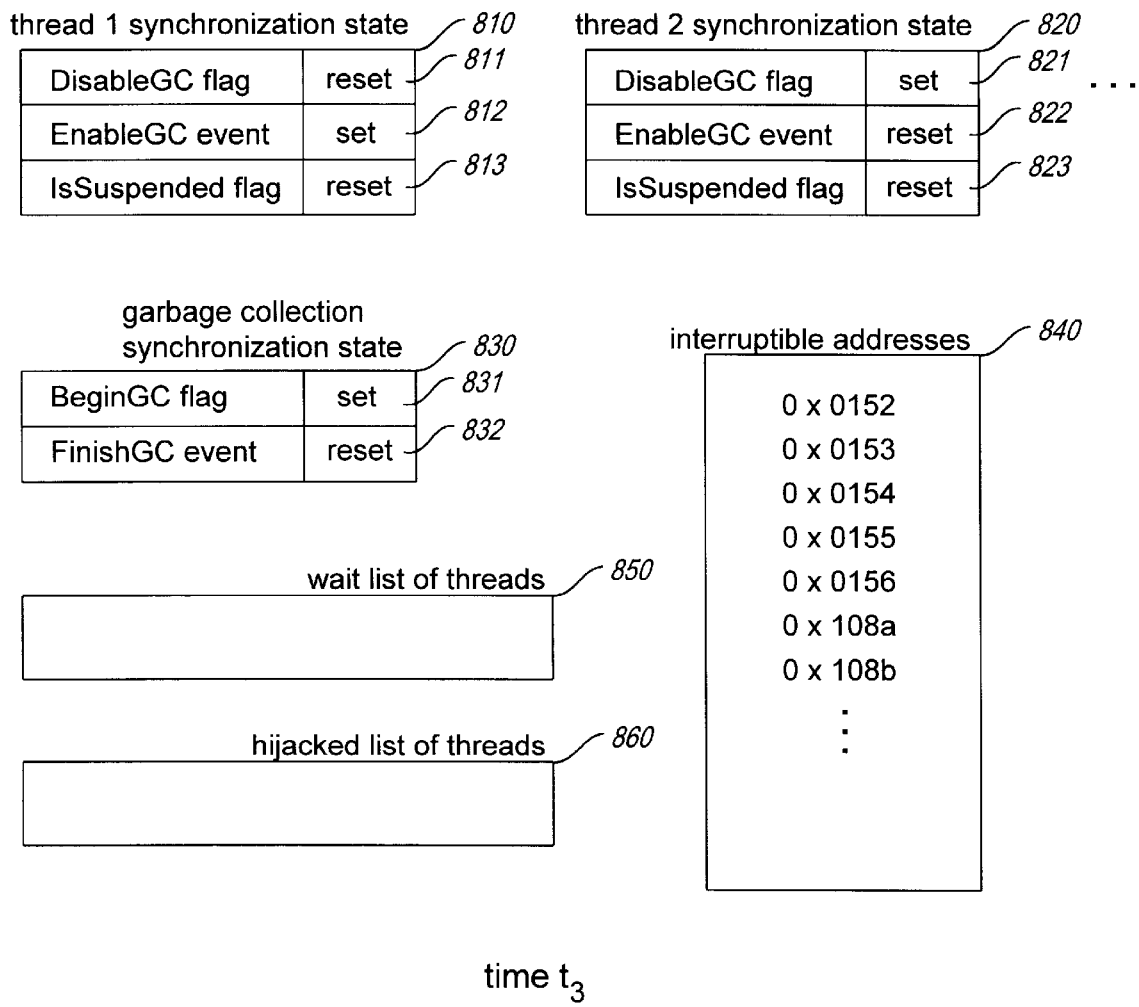
FIG. 8 is a state diagram showing the internal state of the facility at time $t_3$.

At time $t_3$, garbage collection is initiated and the garbage collection thread begins executing and calls the StartGarbageCollection function. As shown in FIGS. 5 and 8, the StartGarbageCollection function sets the BeginGC flag and resets the FinishGC event. After time $t_3$, the StartGarbageCollection function determines that the DisableGC flag for thread 2 is set. The StartGarbageCollection function therefore waits on the EnableGC event of thread 2, which will be set when thread 2 next calls enable garbage collection. At this point, execution of the garbage collection thread is suspended.

Figure 9:
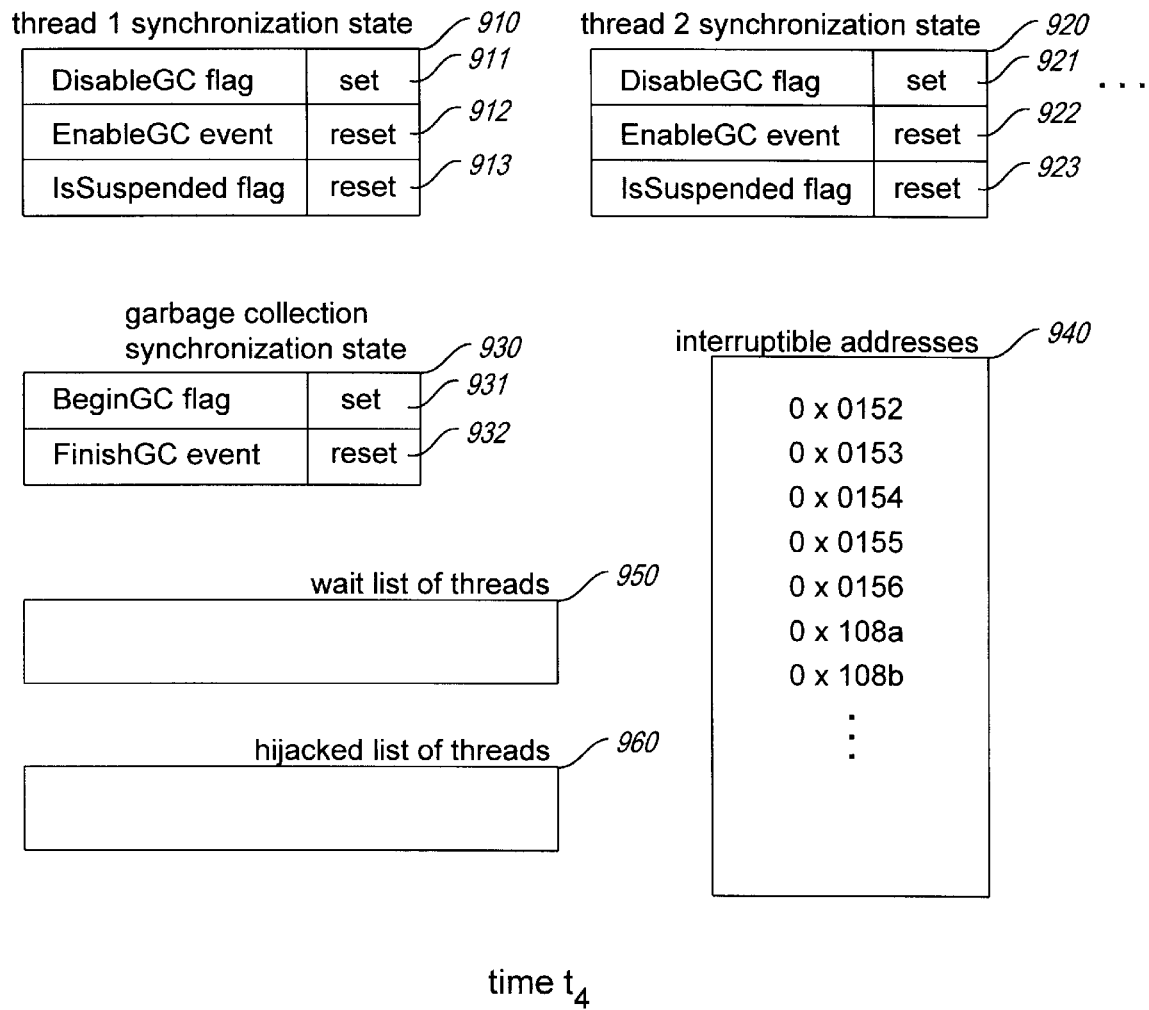
FIG. 9 is a state diagram showing the internal state of the facility at time $t_4$.
Figure 10:
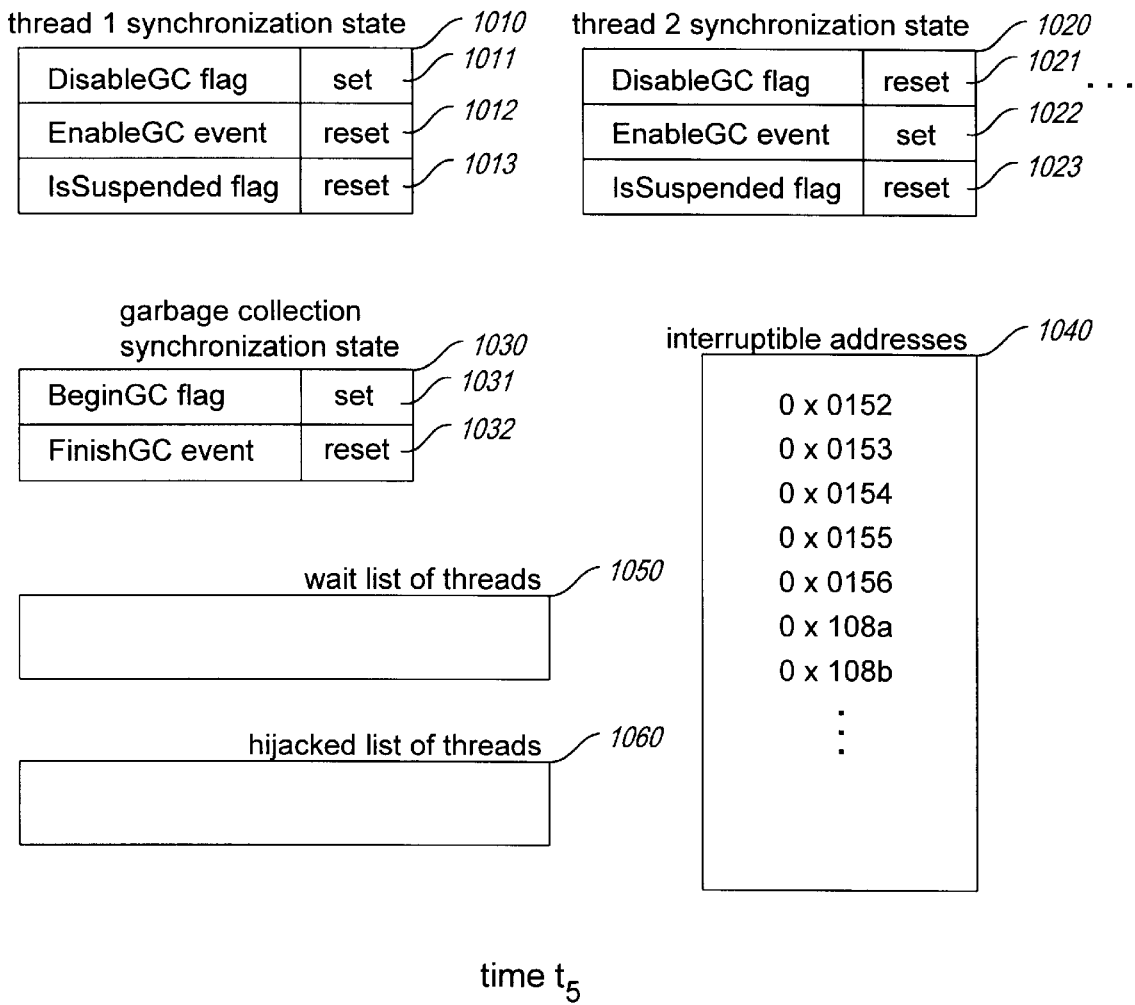
FIG. 10 is a state diagram showing the internal state of the facility at time $t_5$.
Figure 11:
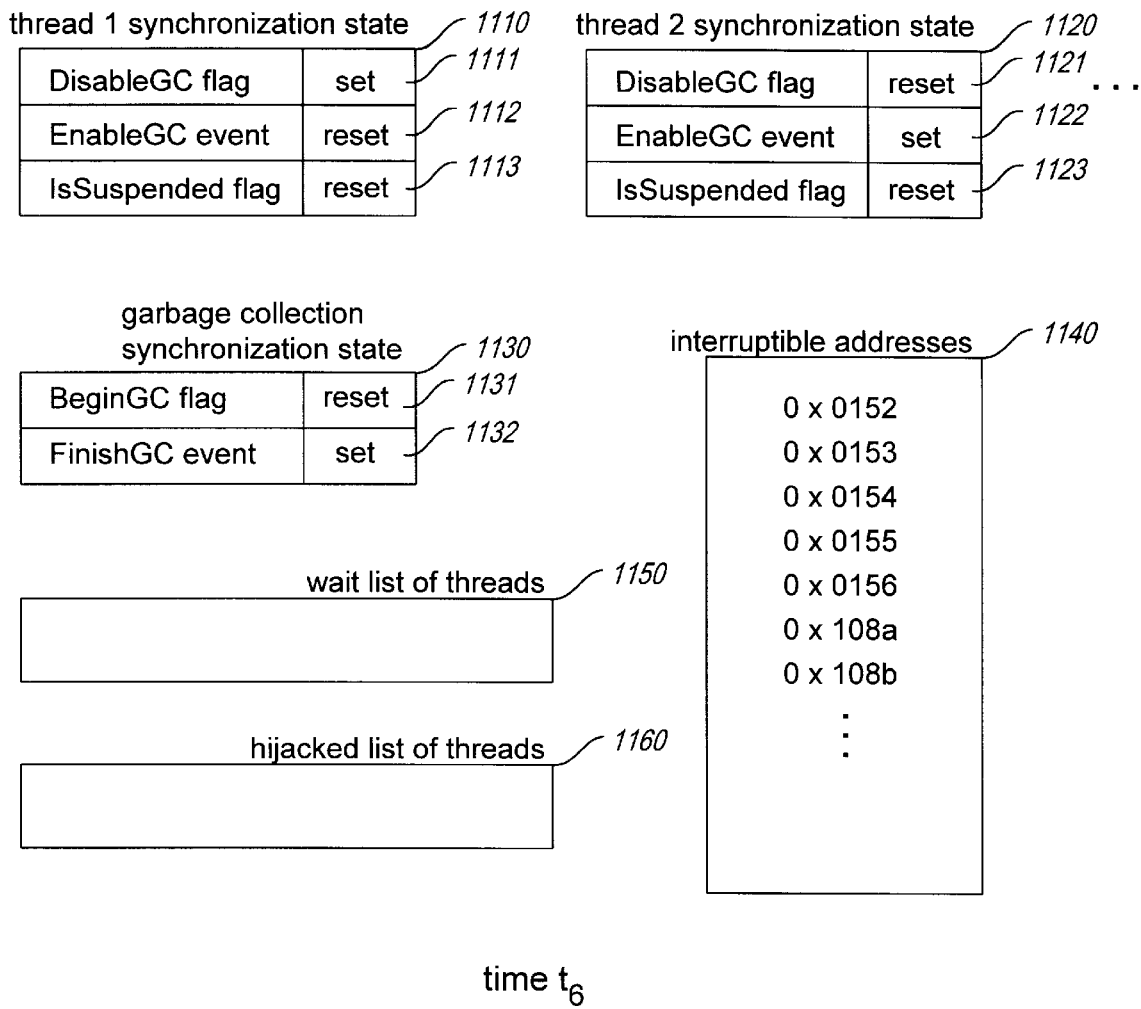
FIG. 11 is a state diagram showing the internal state of the facility at time $t_6$.

At time $t_4$, thread 1 calls the DisableGarbageCollection API. As shown in FIGS. 5 and 9, the DisableGarbageCollection API sets the DisableGC flag and resets the EnableGC event for thread 1. The DisableGarbageCollection API determines that the BeginGC flag is set, and therefore waits on the FinishGC event, which will be set when garbage collection concludes. Execution of thread 1 is therefore suspended until at this time.

At time $t_5$, thread 2 calls the EnableGarbageCollection API. As shown in FIGS. 5 and 9, the EnableGarbageCollection API resets the DisableGC flag and sets the EnableGC event. In response to the setting of the EnableGC event, the garbage collection thread is unsuspended, and the StartGarbageCollection function returns. The garbage collection system thereafter actually performs garbage collection, with thread 1 suspended and threads 2 and 3 executing.

At time $t_6$, garbage collection concludes and the garbage collection system calls the EndGarbageCollection function.

As shown in FIGS. 5 and 9, the EndGarbageCollection function sets the FinishGC event and resets the BeginGC flag. In response to setting the FinishGC event, thread 1 is unsuspended and may begin to execute its reference-accessing section. As garbage collection is concluded, the execution of the garbage collection thread may be suspended until garbage collection is next initiated.

Figure 12:
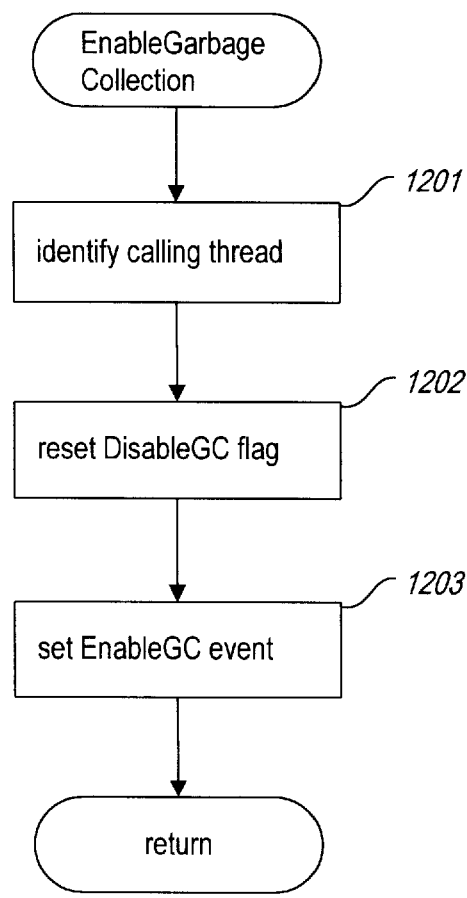
FIG. 12 is a flow diagram showing the steps preferably performed by the facility in the EnableGarbageCollection API.
Figure 13:
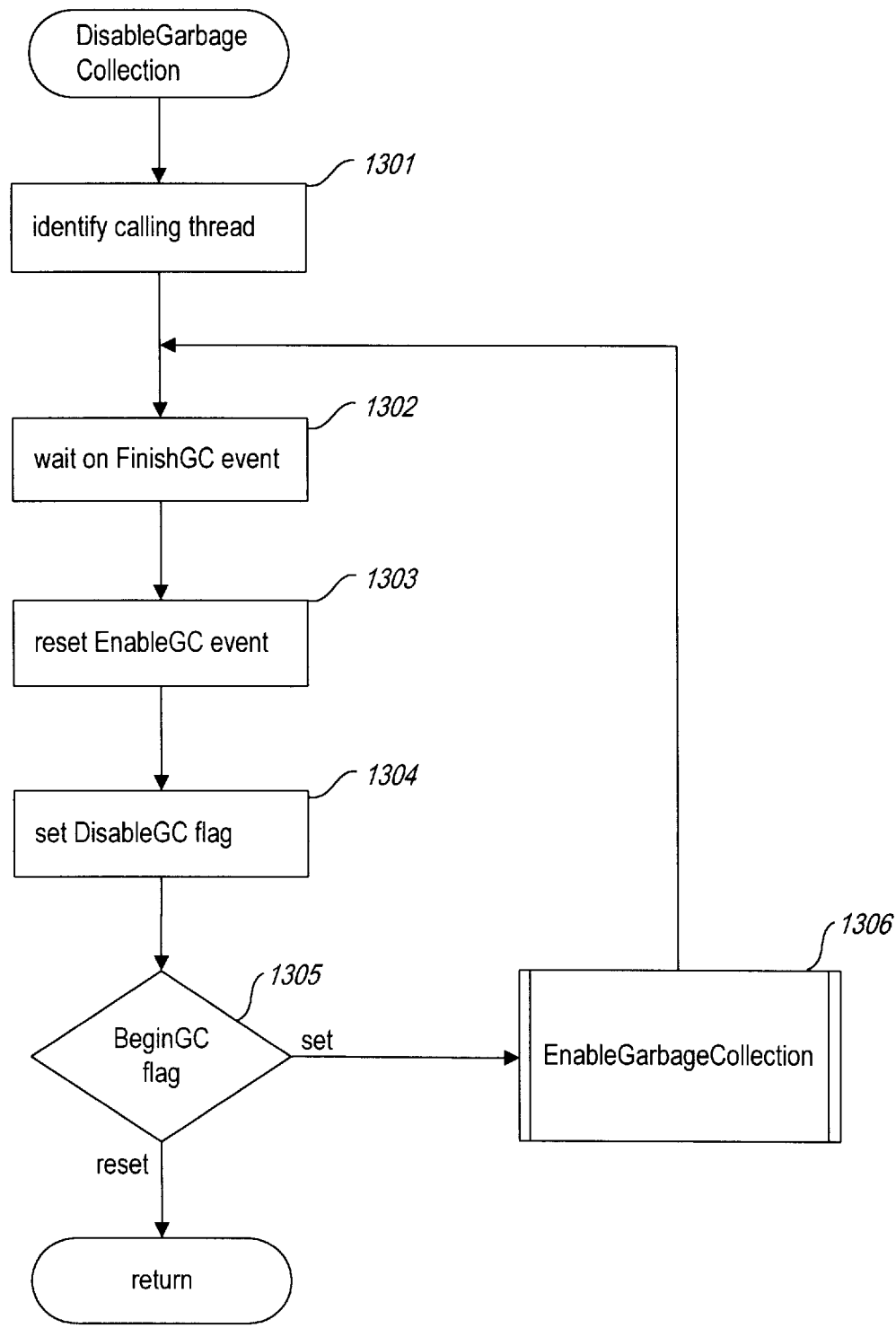
FIG. 13 is a flow diagram showing the steps preferably performed by the facility in the DisableGarbageCollection API.

FIGS. 12 and 13 are flow diagrams showing the Enable-GarbageCollection and DisableGarbageCollection APIs. FIG. 12 is a flow diagram showing the steps preferably performed by the facility in the EnableGarbageCollection API. Threads call the EnableGarbageCollection API when they exit reference-accessing sections. In step 1201, the facility identifies the thread calling the EnableGarbageCollection API. In step 1202, the facility resets the DisableGC flag for the identified thread. In step 1203, the facility sets the EnableGC event for the identified thread. The facility then returns.

FIG. 13 is a flow diagram showing the steps preferably performed by the facility in the DisableGarbageCollection API. Threads call the DisableGarbageCollection API when they enter reference-accessing sections. In step 1301, the facility identifies the thread calling that DisableGarbageCollection API. In step 1302, the facility waits on the FinishGC event. That is, if garbage collection is not in progress and the FinishGC event is set, the facility continues immediately to step 1303. On the other hand, if garbage collection is in progress and the FinishGC event is reset, then the thread executing the DisableGarbageCollection API is suspended until the FinishGC event is set at the conclusion of garbage collection. In step 1303, the facility resets the EnableGC event for the identified thread. In step 1304, the facility sets the DisableGC flag for the identified thread. In step 1305, the facility tests the BeginGC flag. If the BeginGC flag is set, then the facility continues at step 1306, else the facility returns. In step 1306, as the garbage collection process has just begun, the facility calls the EnableGarbageCollection API to allow garbage collection to proceed before the calling thread executes its reference-accessing section. After step 1306, the facility continues at step 1302 to repeat steps 1302–1305.

Figure 14:
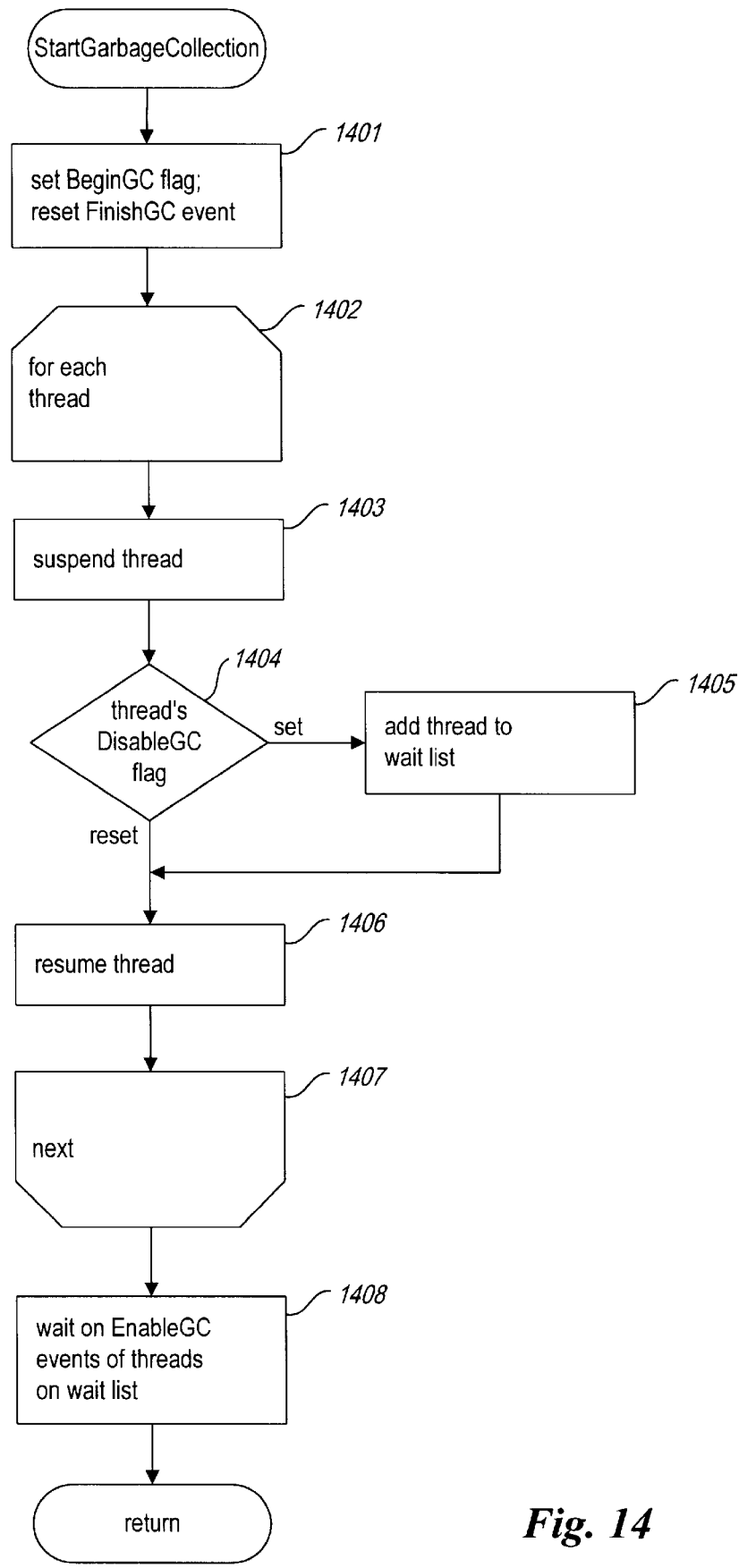
FIG. 14 is a flow diagram showing the steps preferably performed by the facility in the StartGarbageCollection function.
Figure 15:
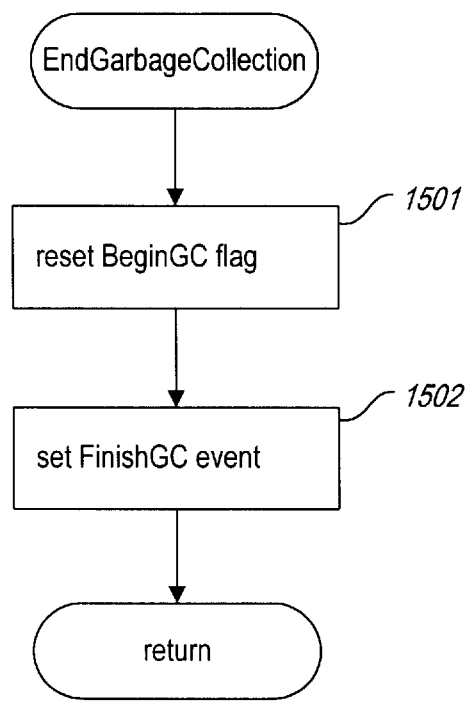
FIG. 15 is a flow diagram showing the steps preferably performed by the facility in the EndGarbageCollection function.

FIGS. 14 and 15 are flow diagrams showing a first embodiment of the StartGarbageCollection and EndGarbageCollection functions. FIG. 14 is a flow diagram showing the steps preferably performed by the facility in the StartGarbageCollection function. The garbage collection system calls the StartGarbageCollection function before performing garbage collection in order to synchronize the performance of garbage collection with the execution of the other threads. In step 1401, the facility sets the BeginGC flag, and resets the FinishGC event. In steps 1402–1407, the facility loops through each thread except the garbage collection thread. That is, steps 1403–1406 are repeated for each thread other than the garbage collection thread. In step 1403, the facility suspends the current thread. In step 1404, if the DisableGC flag of the current thread is set, then the facility continues in step 1405 to add the current thread to the wait list so that the facility waits for the thread's DisableGC flag to be set before performing garbage collection. After step 1405, the facility continues at step 1406. In step 1406, the facility resumes execution of the thread, which was suspended in step 1403. Because steps 1404 and 1405 are performed quickly, execution of the thread is suspended for a very short period of time (not shown in the timing diagrams discussed above). In step 1407, the facility loops back to step 1402 to process the next thread. In step 1408, the facility waits on the EnableGC events of all of the threads on the wait list. When all of the EnableGC events of the threads on the wait list have been set, the facility returns to the garbage collection system, which proceeds to perform garbage collection.

FIG. 15 is a flow diagram showing the steps preferably performed by the facility in the EndGarbageCollection function. The garbage collection system calls the EndGarbageCollection function after the performance of garbage collection is concluded. In step 1501, the facility reset the BeginGC flag. In step 1502, the facility sets the FinishGC event. The step of setting the FinishGC event allows threads that are waiting for garbage collection to conclude before executing reference-accessing sections to resume execution. After step 1502, the facility returns.

The embodiment of the invention discussed above waits to actually perform garbage collection until each thread that disabled garbage collection before garbage collection was initiated calls the EnableGarbageCollection API. Implicit in this approach is an expectation that the programs executed by the other threads will not disable garbage collection for long periods of time, thereby delaying the performance of garbage collection significantly.

A further embodiment of the invention adds additional techniques for expediting the performance of garbage collection while threads are executing reference-accessing blocks. A first technique involves tracking addresses of programs in which threads executing the programs may be safely suspended. For example, the interruptible addresses table 440 in FIG. 4 shows several addresses which threads executing programs may be interrupted. In one embodiment, these addresses correspond to addresses for which the compiler has identified all pointers to garbage-collected objects stored in registers or on the stack. This identification of pointers is used by the garbage collection process in analyzing the pointers in use by the suspended thread. When the StartGarbageCollection function encounters a thread that has disabled garbage collection that is executing at an interruptible address, the facility preferably suspends the thread instead of waiting for the thread to exit its reference-accessing section and call the EnableGarbageCollection API.

A second technique involves patching, or "hijacking," returns from a calling program to a called program in the StartGarbageCollection function where the thread executing the called program has disabled garbage collection, and where the called program is not interruptible. The hijacking technique is based upon the recognition that a call return is a safe time to interrupt the execution of a thread. As a result of this hijacking, when the called program returns, it returns not to the calling program, but to a SuspendReturn program that causes the thread to be suspended by calling the EnableGarbageCollection API, then calling the DisableGarbageCollection API. At the end of the SuspendReturn program, the thread returns to the calling program.

Figure 16:
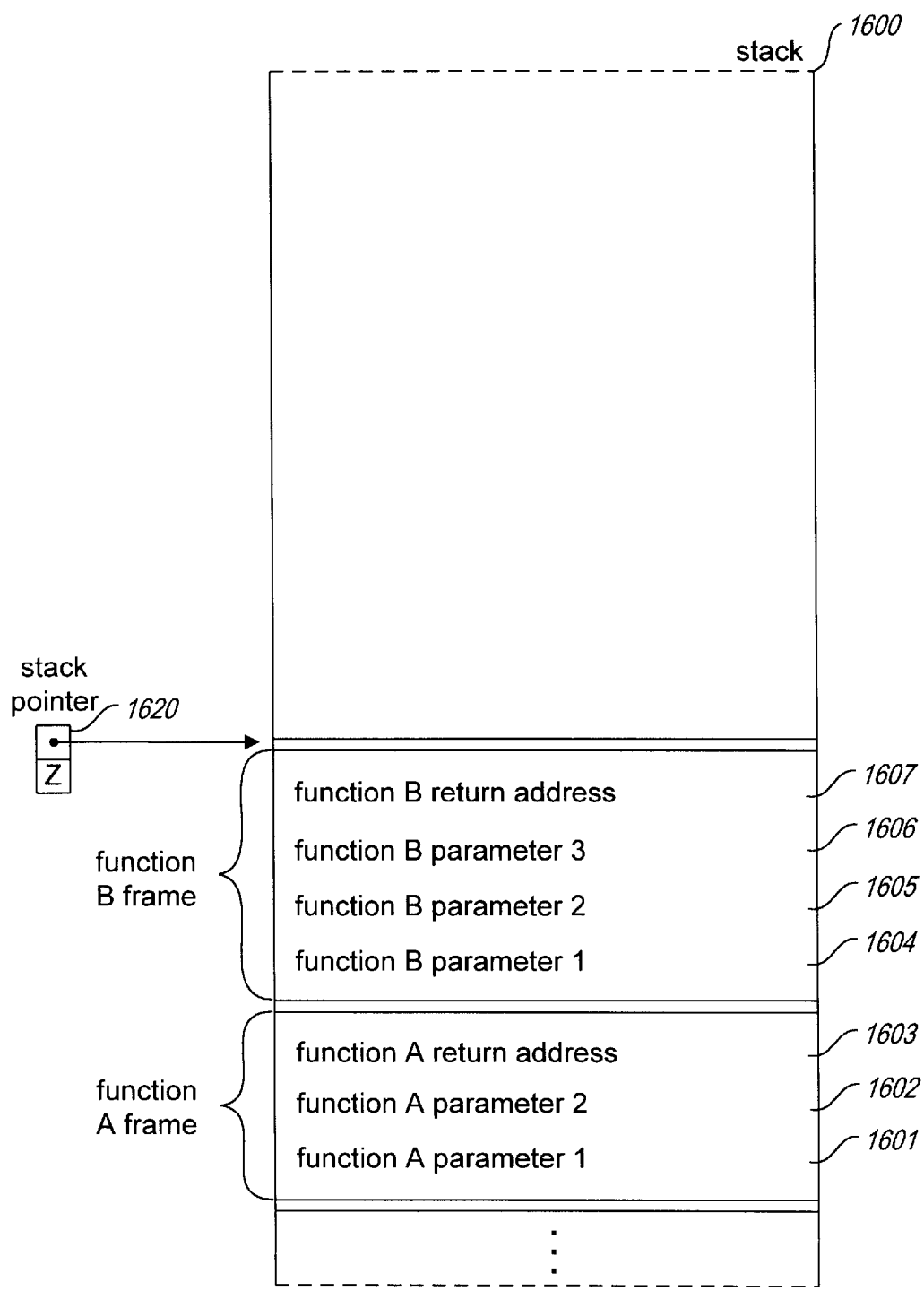
FIG. 16 is a memory diagram showing the initial state of the stack after a calling program named "function A" has called a called program named "function B."

FIGS. 16–20 are memory diagrams showing the contents of a thread's stack throughout the hijacking process. FIG. 16 is a memory diagram showing the initial state of the stack after a calling program named "function A" has called a called program named "function B." FIG. 16 shows the stack 1600 and a stack pointer 1620 that identifies the top of the stack. A push operation adds a value to the top of the stack and moves the stack pointer up to point to the added value. A pop operation removes a value from the top of the stack, and moves the stack pointer down. When one program calls another program, it typically pushes a group of values relating to the call and onto the stack. This group of values is called a "stack frame." The stack 1600 initially contains two stack frames. The stack frame for function A was pushed onto the stack when function A was called, and comprises values 1601, 1602, and 1603. The stack frame for function B was pushed onto the stack when function A called function B. The stack memory for function B is made up of parameters 1604, 1605, and 1606 passed from function A to function B, and a return address 1607 used to return from function B to the calling point in function A. In the normal course of events, when function B returns to function A, function B would pop the return address 1607 off of the stack, moving the stack pointer 1620 down one value to parameter 1606. Function B would then jump to the return address popped off of the stack. After function B jumps to the return address in function A, function A would proceed to pop the parameters 1606, 1605 and 1604 off of the stack, moving the stack pointer 1620 down to return address 1603.

Figure 17:
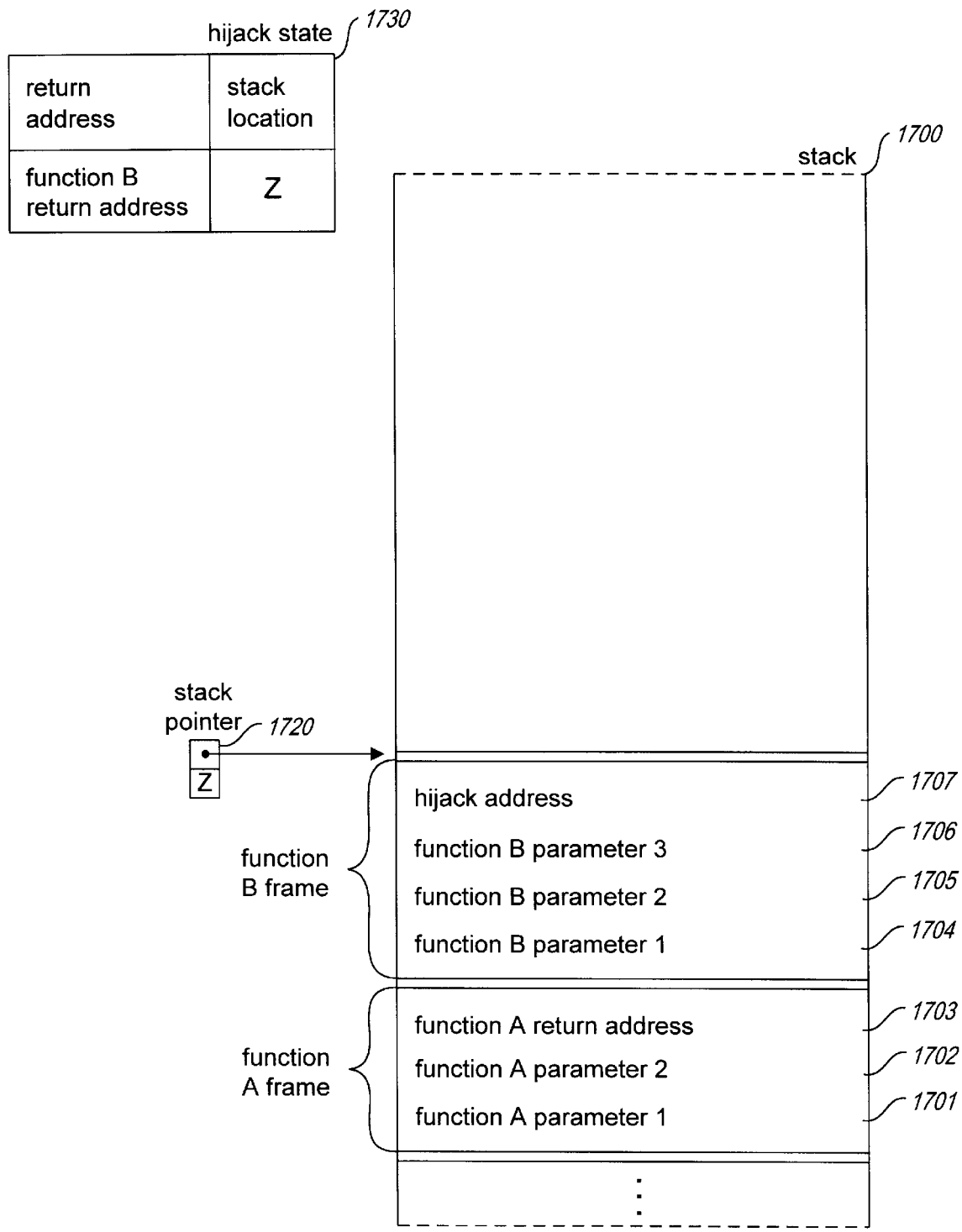
FIG. 17 is a memory diagram showing the modification of the stack in order to hijack the return from function B to function A.

FIG. 17 is a memory diagram showing the modification of the stack in order to hijack the return from function B to function A. FIG. 17 shows that the facility has replaced the function B return address 1907 (FIG. 19) at the top of the stack with a hijack address 1707. A hijack address is the address of the SuspendReturn program discussed above. As described in conjunction with FIG. 19, when function B returns, it will pop the value at the top of the stack off of the stack and jump to that address. Thus, by replacing the function B return address with a hijack address, the facility ensures that the SuspendReturn program will be executed when function B returns.

In addition to the stack 1700, FIG. 17 shows a hijack state 1730 used by the facility to track its hijacking of the thread. This thread state is preferably stored in a thread control block. The thread control block contains information relating to the thread, and is stored in memory accessible only to the thread. The hijack state contains the return address that was replaced with the hijack address, and the location on the stack containing the hijack address. When the facility replaced the function B return address with the hijack address, it stored the hijack state 1730 in the thread control block. The hijack state 1730 contains the function B return address that was replaced with the hijack address and the stack location "Z" copied from the stack pointer 1720. This information is used by the facility to return to function A when the SuspendReturn program completes.

Figure 18:
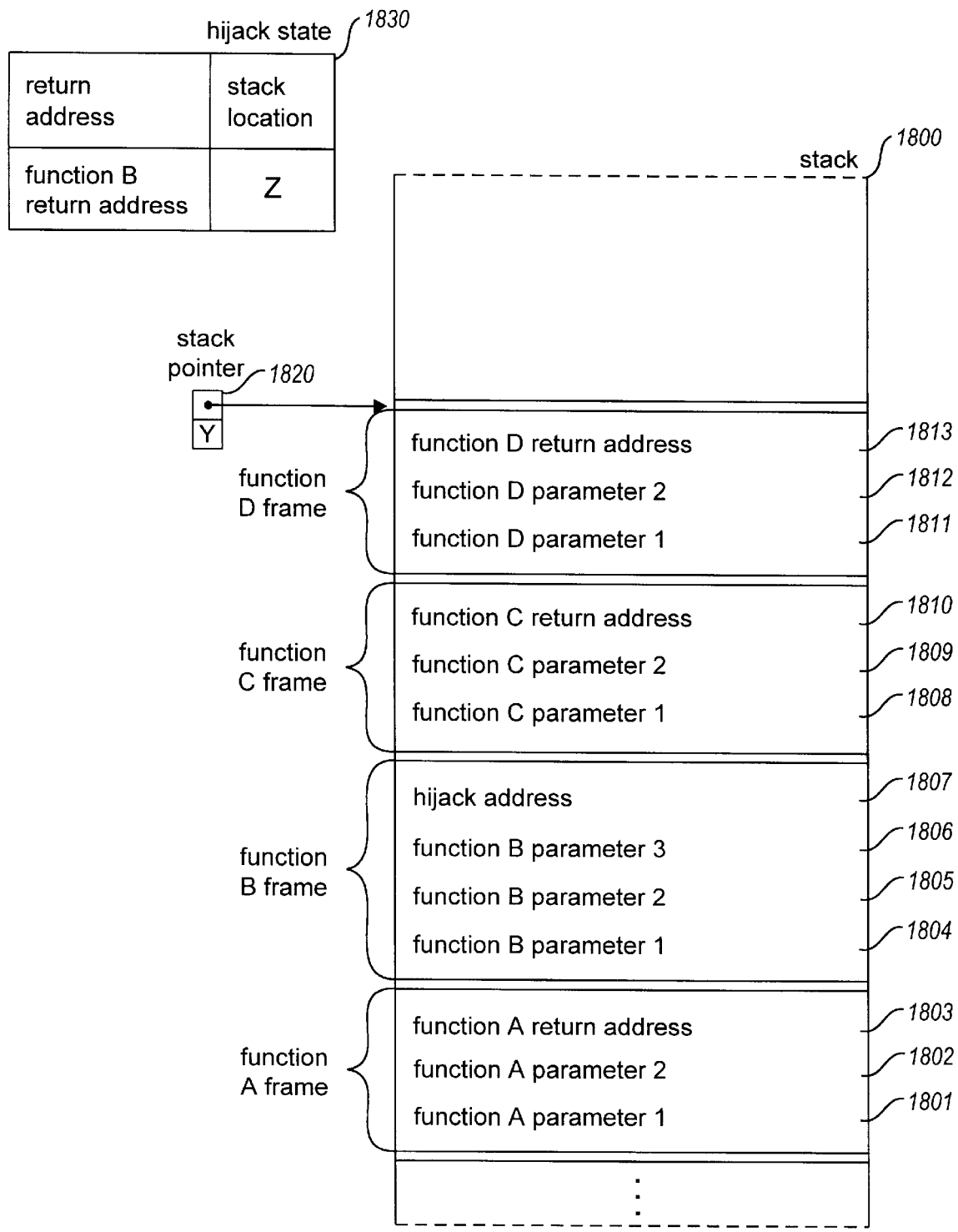
FIG. 18 is a memory diagram showing the facility rehijacking a thread.

While hijacking a thread once during the StartGarbageCollection function may be adequate to suspend many threads in a timely manner, some threads may continue to call additional programs before executing the hijacked return. In order to expedite the suspension of hijacked threads, the facility preferably periodically rehijacks threads whose hijacking has not yet been successful. FIG. 18 is a memory diagram showing the facility rehijacking a thread. FIG. 18 shows that function B, whose return to function A was earlier hijacked by the facility, has called function C, which in turn has called function D. Stack frames for functions C and D, comprising values 1808–1810 and 1811–1813, respectively, have been pushed on the stack, moving stack pointer 1822 to its new address, "Y." In order to expedite the time at which the SuspendReturn program will be executed for this thread, the facility moves the hijack address from the function B frame to the function D frame.

Figure 19:
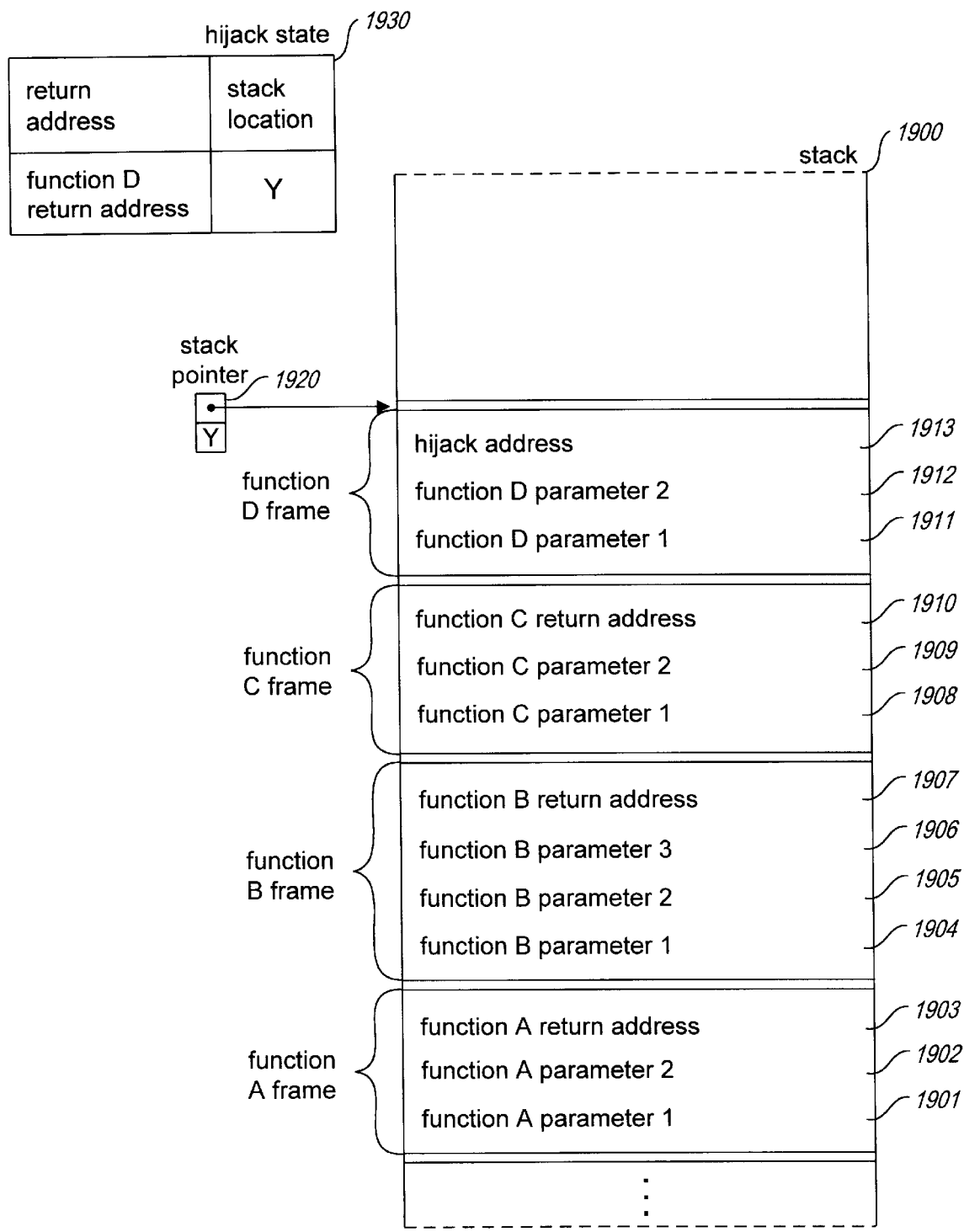
FIG. 19 is a memory diagram showing further details of rehijacking a thread.

FIG. 19 is a memory diagram showing further details of rehijacking a thread. FIG. 19 shows that the facility has replaced the function D return address 1813 (FIG. 18) with the hijack address 1913. The facility has further replaced the hijacked address 1807 (FIG. 18) in the function B stack frame with the function B return address 1907, obtained from the hijack state 1830. Finally, the facility has replaced stack location "Z" (FIG. 18) in the hijack state 1931 with the stack location "Y." Following the rehijacking, when function D returns, the SuspendReturn program will be executed immediately.

Figure 20:
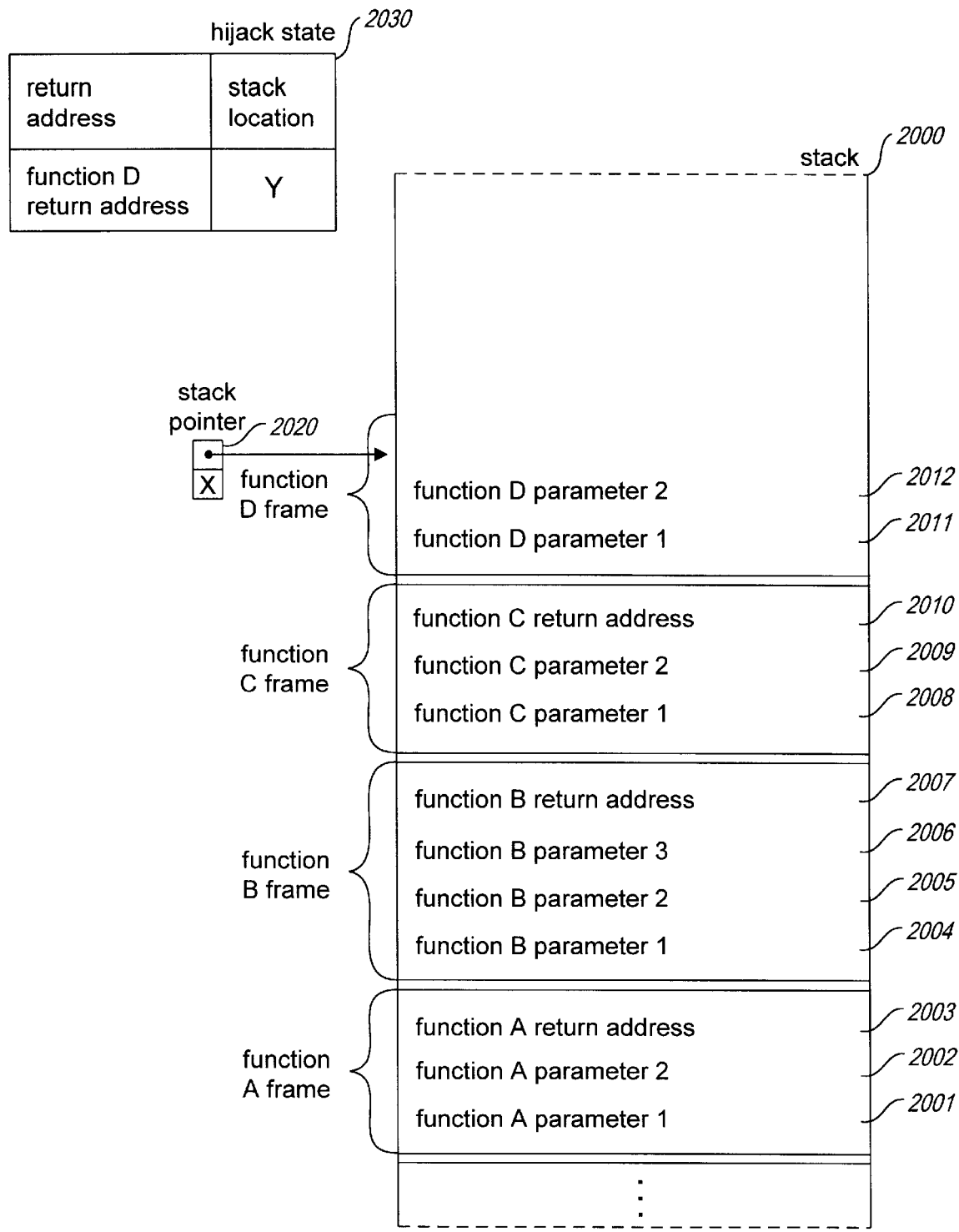
FIG. 20 is a memory diagram showing the execution of the SuspendReturn program.

FIG. 20 is a memory diagram showing the execution of the SuspendReturn program. When function D returns, function D pops the top value 1913 (FIG. 19) off of the stack and jumps to this address. As a result of the rehijacking, the popped value is the hijack address. As part of the pop operation, the stack pointer is moved down one value to point to function D parameter 2 2012. Jumping to the hijack address executes the SuspendReturn program, discussed in detail below in conjunction with FIG. 23. Briefly, the SuspendReturn program calls the EnableGarbageCollection API, then the DisableGarbageCollection API for the thread, then jumps to the function D return address stored in hijack state 2030.

Figure 21:
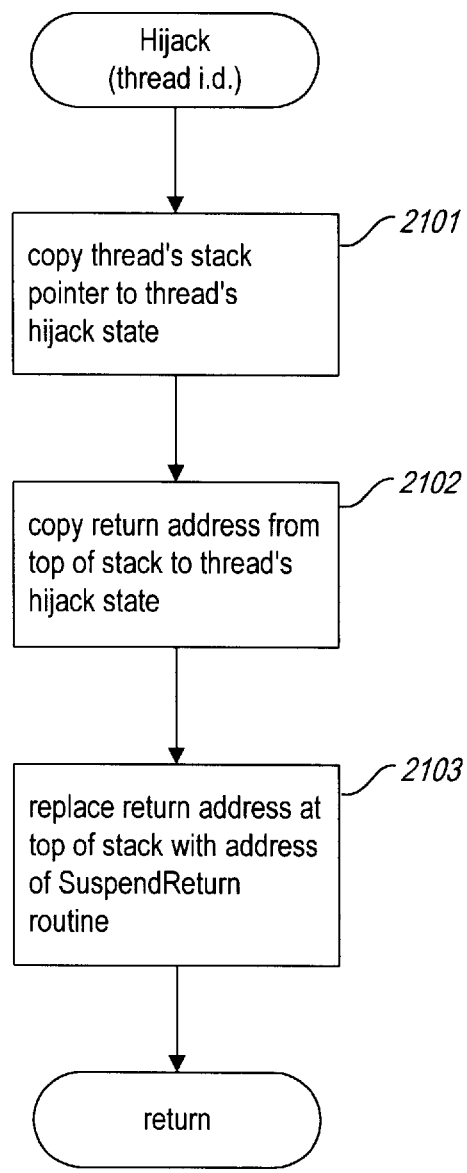
FIG. 21 is a flow diagram showing the steps preferably performed by the facility in order to hijack a particular thread.

FIGS. 21–25 are additional flow diagrams showing the steps performed in accordance with the further embodiment. FIG. 21 is a flow diagram showing the steps preferably performed by the facility in order to hijack a particular thread. These steps are performed for hijackable threads by the StartGarbageCollection function. In step 2101, the facility copies the stack pointer for the thread to the hijack state to enable the thread to be rehijacked at a later time. In step 2202, the facility copies the return address from the top of the stack to the hijack state to enable the SuspendReturn program to return to the program that made the pending call. In step 2103, the facility replaces the return address at the top of the stack with the address of the SuspendReturn program, so that when the called program returns, it returns to the SuspendReturn program instead of the calling program. These steps then conclude.

Figure 22:
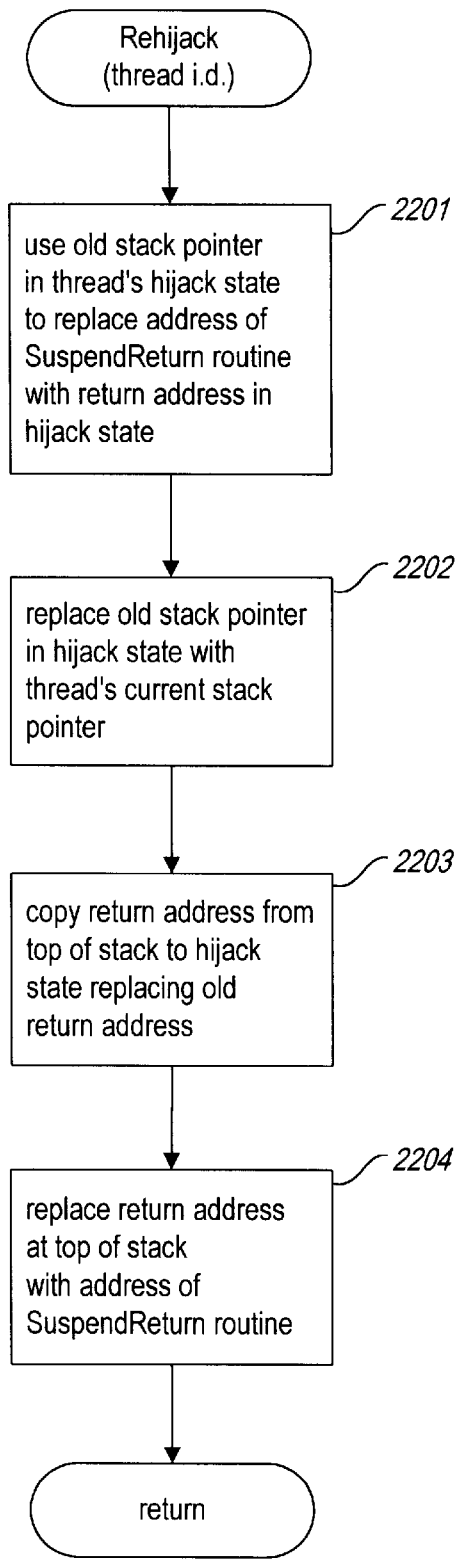
FIG. 22 is a flow diagram showing the steps preferably performed by the facility in order to rehijack a particular thread.

FIG. 22 is a flow diagram showing the steps preferably performed by the facility in order to rehijack a particular thread. These steps are preferably performed by the StartGarbageCollection function when a thread has been hijacked, but does not execute the SuspendReturn program within a predetermined amount of time. In step 2201, the facility uses the stack pointer value stored in the hijack state for the thread to replace the address of the SuspendReturn routine with the return address stored in the hijack state, thereby restoring the originally-hijacked return address. In step 2202, the facility replaces the stack pointer in the hijack state with the current stack pointer of the thread. In step 2203, the facility copies the return address from the top of the stack to the hijack state, replacing the old return address in the hijack state so that, after the SuspendReturn program is executed, the thread returns to the program that made the current call. In step 2204, the facility replaces the return address at the top of the stack with the address of the SuspendReturn program, so that the program called in the current call returns to the SuspendReturn program instead of to the program that made the current call. These steps then conclude.

Figure 23:
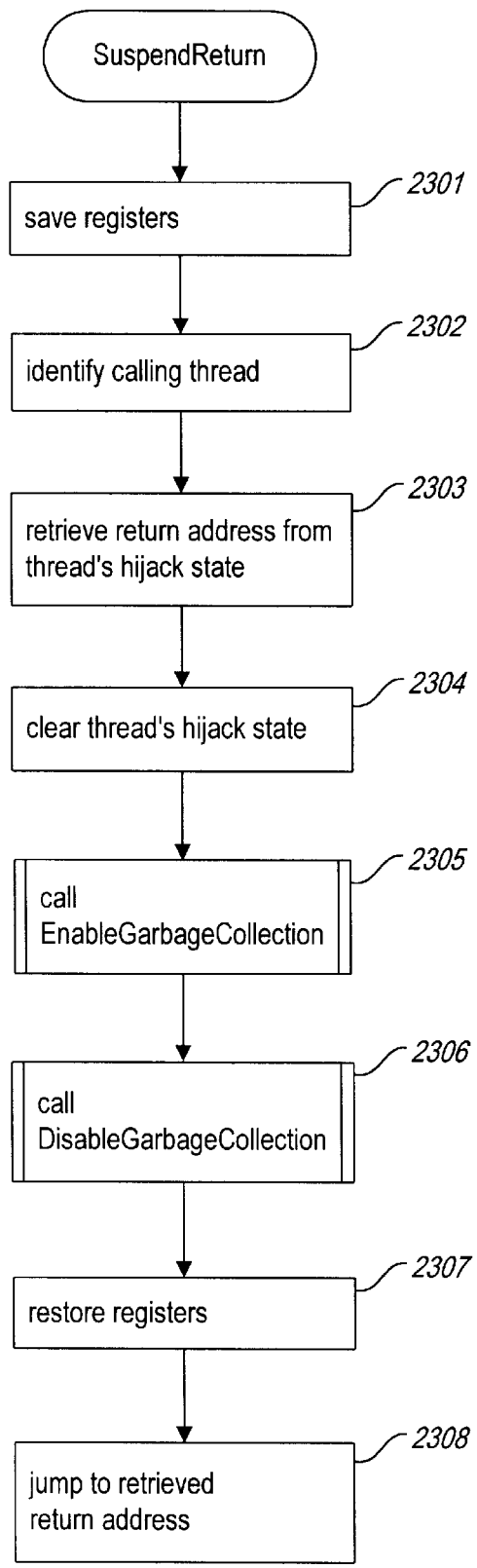
FIG. 23 is a flow diagram showing the steps preferably performed by the facility in the SuspendReturn program.

FIG. 23 is a flow diagram showing the steps preferably performed by the facility in the SuspendReturn program. The SuspendReturn program is executed when the call that was being made when the thread was last hijacked returns. In step 2301, the facility saves the contents of any of the thread's registers that are used by the SuspendReturn program, so that the execution of the SuspendReturn program does not have adverse effects on the continued execution of the calling program. In step 2302, the facility identifies the thread executing the SuspendReturn program. In step 2303, the facility retrieves the return address for the thread from the hijack table. In step 2304, the facility clears the hijack state for the thread. In step 2305, the facility calls the EnableGarbageCollection API in order to set the thread's EnableGC event and enable performance of garbage collection to proceed. In step 2306, the facility calls the DisableGarbageCollection API, which causes the thread to be suspended until garbage collection concludes. In step 2307, when the thread resumes execution, the facility restores the registers saved in step 2301. Finally, in step 2308, the facility jumps to the return address retrieved from the hijack table in step 2305. As a result, execution continues in the calling program immediately after the call.

Figure 24:
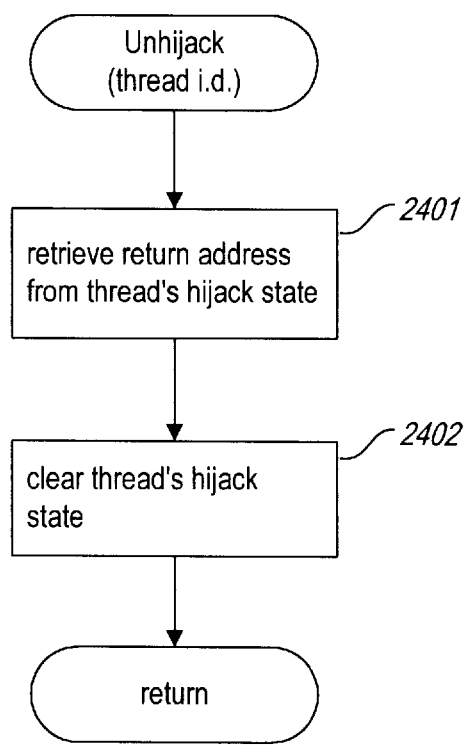
FIG. 24 is a flow diagram showing the steps preferably performed by the facility in order to unhijack a particular thread.

FIG. 24 is a flow diagram showing the steps preferably performed by the facility in order to unhijack a particular thread. These steps are preferably performed by the StartGarbageCollection function when a thread has been hijacked, but is no longer hijackable when the thread is to be rehijacked. In step 2401, the facility retrieves the return address for the thread from the hijack table. In step 2304, the facility clears the hijack state for the thread. These steps then conclude.

Figure 25A:
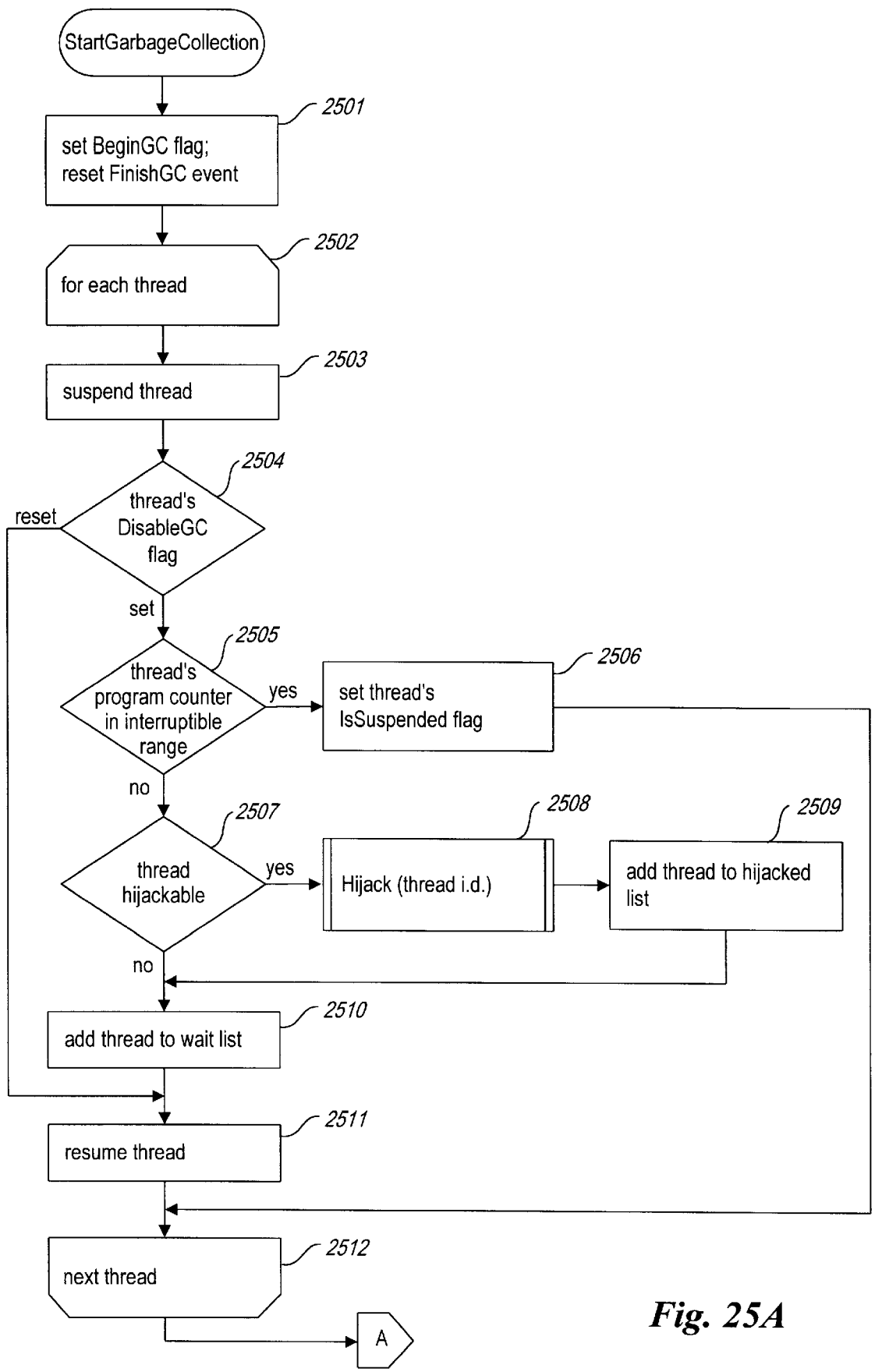
FIGS. 25A and 25B together comprise a flow diagram showing the steps preferably performed by the facility in the StartGarbageCollection function in accordance with the further embodiment.
Figure 25B:
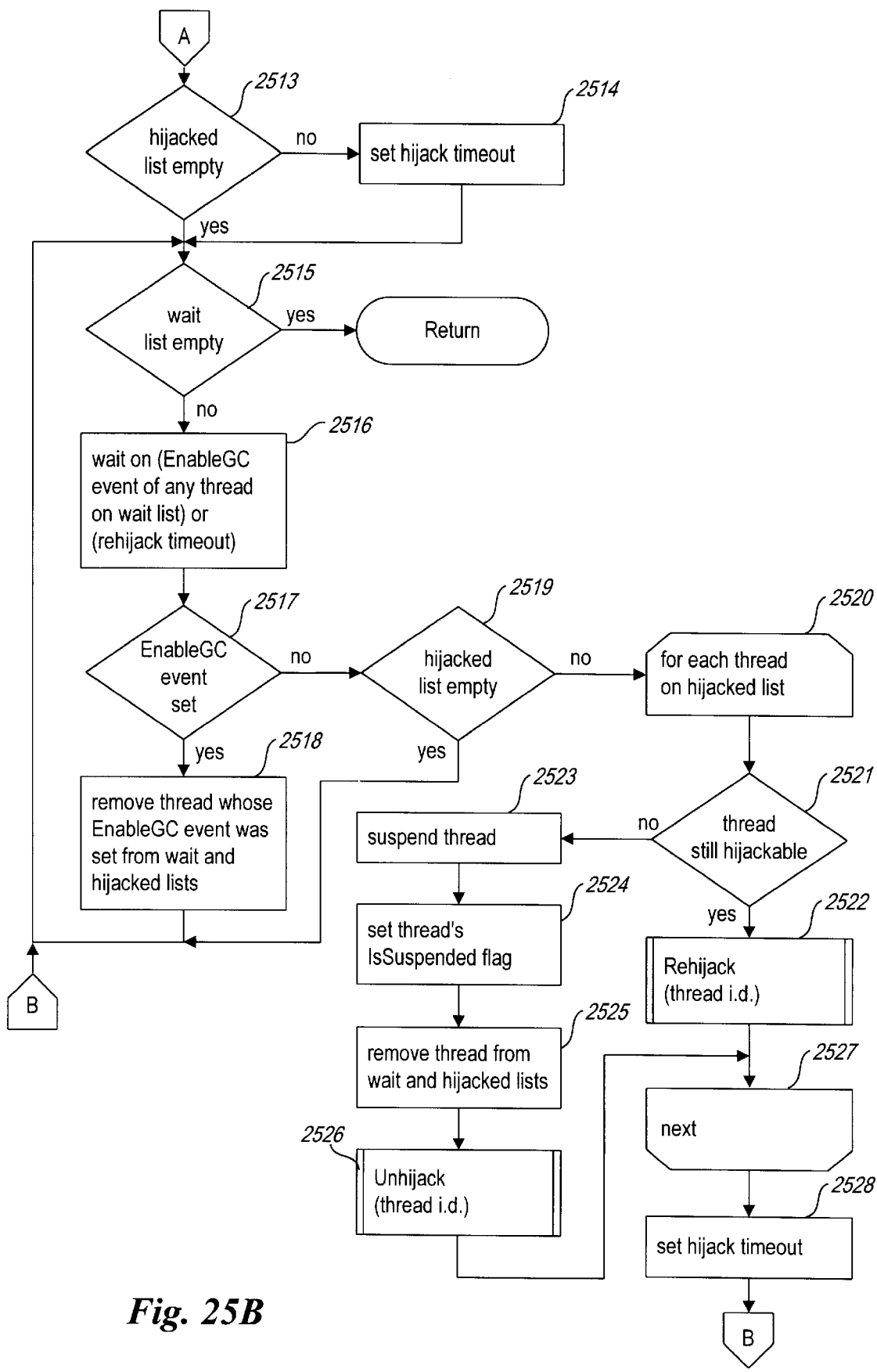
Figure 26:
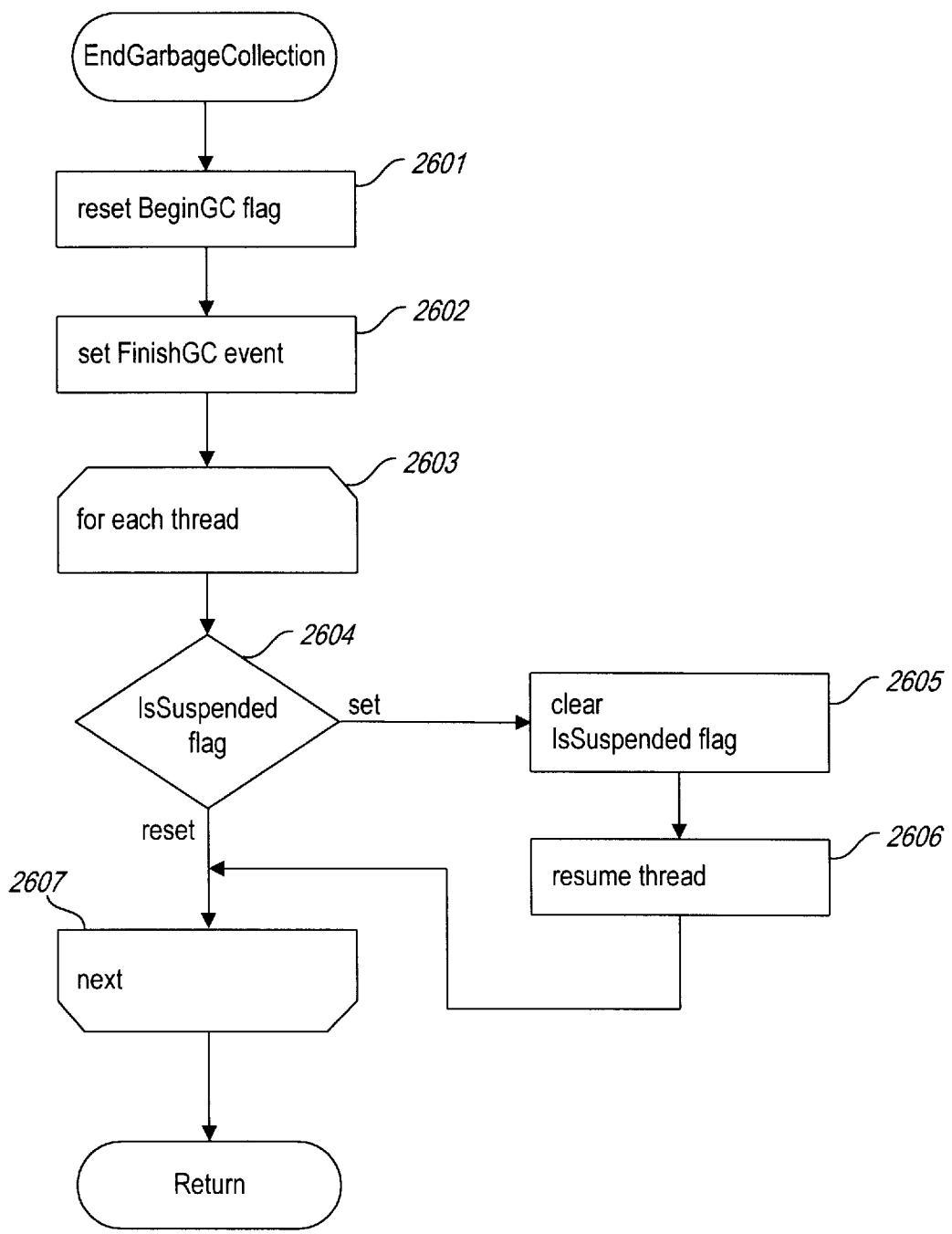
FIG. 26 is a flow diagram showing the steps preferably performed by the facility in the EndGarbageCollection function in accordance with the further embodiment.

FIGS. 25A–25B and 26 are flow diagrams showing implementations of the StartGarbageCollection and EndGarbageCollection functions enhanced in accordance with the further embodiment. FIGS. 25A and 25B together comprise a flow diagram showing the steps preferably performed by the facility in the StartGarbageCollection function in accordance with the further embodiment. In step 2501, the facility sets the BeginGC flag and resets the FinishGC event. In steps 2502–2512, the facility loops through each thread other than the garbage collection thread. That is, the facility repeats steps 2503–2511 for each thread besides the garbage collection thread. In step 2503, the facility suspends the current thread. In step 2504, if the DisableGC flag of the current thread is set, then the facility continues at step 2505, else the facility continues at step 2511. In step 2505, if the thread's program counter is within an interruptible range, then the facility continues at step 2506, else the facility continues at step 2507. In step 2506, the facility sets the IsSuspended flag of the thread to indicate that the thread must be unsuspended by the EndGarbageCollection function when garbage collection concludes. After step 2506, the facility continues at step 2512. In step 2507, if the thread is hijackable, then the facility continues at step 2508, else the facility continues at step 2510. In step 2508, the facility calls the steps shown in FIG. 21 for hijacking the thread. In step 2509, the facility adds the thread to the list of hijacked threads. After step 2509, the facility continues at step 2510. In step 2510, the facility adds the thread to the wait list, so that the facility waits on the EnableGC event of the thread before returning from the StartGarbageCollection function. In step 2512, the facility loops back to step 2502 to process the next thread. After all the threads are processed, the facility continues through connector A to step 2513.

In step 2513, if the hijacked list is empty, then the facility continues at step 2515, else the facility continues at step 2514. In step 2514, the facility sets a timeout for rehijacking the hijack threads. The hijacked threads that have not been suspended by the time the timeout occurs will be rehijacked. The timeout is preferably set as a substantial period, such as 250 milliseconds. Setting a timeout at too small of a period results in rehijacking too many threads, while setting the timeout at too large of a period increases the length of the delay until garbage collection can be performed. After step 2514, the facility continues in step 2515. In step 2515, if the wait list is empty, then the facility returns from the StartGarbageCollection function and garbage collection may be performed, else the facility continues in at step 2516. In step 2516, the facility waits on the EnableGC event of any thread on the wait list or on the rehijack timeout set in step 2515. As a result, execution will continue at step 2517 when any of these EnableGC events are set or when the rehijack timeout occurs after the timeout period has expired. In step 2517, if execution continued as the result of an EnableGC event being set, then the facility continues in step 2518, else the facility continues in step 2519. In step 2518, the facility removes the thread whose EnableGC event was set from the wait list so that the facility does not wait on the EnableGC event of this thread when step 2516 is repeated. In step 2518, the facility further removes the thread from the hijacked list if the thread is on the hijacked list so that the thread will not be rehijacked. After step 2518, the facility continues in step 2515. In step 2519, if the hijacked list is empty, then the facility continues at step 2515, else the facility continues at step 2520 to rehijack the hijacked threads. In steps 2520–2527, the facility loops through each thread on the hijacked list. That is, steps 2521–2526 are repeated for each step on the hijacked list. In step 2521, if the thread is still hijackable, the facility continues in step 2522 to rehijack the thread, else the facility continues in step 2523 to suspend the thread. In step 2522, the facility executes the steps shown in FIG. 22 for rehijacking the thread. After step 2522, the facility continues in step 2527.

In steps 2523–2526, the facility suspends and unhijacks the thread. In step 2523, the facility suspends the thread. In step 2524, the facility sets the thread's IsSuspended flag. In step 2525, the facility removes the thread from both the wait list and the hijacked list. In step 2526, the facility executes the steps shown in FIG. 24 for unhijacking the thread. After step 2526, the facility continues in step 2527.

In step 2527, the facility loops back to step 2520 to process the next thread on the hijacked list. After all of the threads on the hijacked list are processed, the facility continues in step 2528. In step 2528, the facility again sets the hijack timeout as in step 2514. After step 2528, the facility continues through connector B to step 2515.

FIG. 26 is a flow diagram showing the steps preferably performed by the facility in the EndGarbageCollection function in accordance with the third embodiment. In step 2601, the facility resets the BeginGC flag. In step 2602, the facility sets the FinishGC event, allowing threads waiting on the FinishGC event in the DisableGarbageCollection API to resume execution and begin executing reference-accessing sections. In steps 2603–2607, the facility loops through each thread. That is, steps 2604–2606 are repeated for each thread. In step 2604, if the IsSuspended flag of the current thread is set, then the facility continues at step 2605, else the facility continues at step 2607. In step 2605, the facility clears the IsSuspended flag of the thread. In step 2606, the facility resumes execution of, or "unsuspends," the thread. In step 2607, the facility loops back to step 2603 to process the next thread. When all the threads are processed, the facility returns from the EndGarbageCollection function.

As mentioned above, in cases where one program calls another program, efforts by the calling program to correctly maintain the enabled or disabled state for the thread may interact with efforts by the called program to correctly maintain the enabled or disabled state for the thread. The facility therefore provides an additional set of APIs for use by programs in such cases. The additional set of APIs tracks the enabled or disabled state of each thread by maintaining a count of the number of outstanding times that the thread has disabled garbage collection without correspondingly enabling garbage collection ("the DisableGC count"). When this count is zero, garbage collection is enabled for the thread. When the count is non-zero, garbage collection is disabled for the thread. By adjusting the count in a relative instead of an absolute way, the additional set of APIs allow a called program to manipulate the enabled or disabled state as appropriate for its steps, while resuming the same state that existed in the calling program before the call.

FIG. 27 is a code diagram showing the use of the additional set of APIs by a program that is called by another program. This program 2700, comprised of lines 1–14, contains a reference-accessing section at steps 3–6, and a section not accessing references at lines 9–12. In line 2, before the reference-accessing section, instead of calling the DisableGarbageCollection API, the program calls an IncrementDisableGCCount API. The IncrementDisableGCCount API increments the DisableGC count for the thread. The IncrementDisableGCCount API further performs the steps shown in FIG. 13 for the DisableGarbageCollection API in order to ensure that garbage collection is disabled for the thread, and to synchronize with the garbage collection process. After the reference-accessing section, the program calls the DecrementDisableGCCount API in line 7. The DecrementDisableGCCount API decrements the DisableGC count for the thread. If, after decrementing, the DisableGC count is zero, the DecrementDisableGCCount API further performs the steps shown in FIG. 12 for the EnableGarbageCollection API to ensure that garbage collection is enabled for the thread.

In line 8, before the section not accessing references, the program calls the SaveAndZeroDisableGCCount API in order to completely enable garbage collection. By calling the SaveAndZeroDisableGCCount API, the program assumes that it is safe from the thread's perspective to perform garbage collection, and, in particular, that that each calling program registered all of the pointers that it was using with the garbage collection system before calling. The SaveAndZeroDisableGCCount API first copies the current DisableGC count to another location, then sets the DisableGC count to zero. The SaveAndZeroDisableGCCount API further performs the steps shown in FIG. 12 for the EnableGarbageCollection API in order to enable garbage collection for the section not accessing references. After completing the section not accessing references, the program calls the RestoreDisableGCCount API. The RestoreDisableGCCount API copies the former DisableGC count back to be the current DisableGC count. If the restored DisableGC count is greater than zero, then the RestoreDisableGCCount API further performs the steps shown in FIG. 13 for the DisableGarbageCollection API in order to disable garbage collection for the thread and synchronize with the performance of garbage collection.

It can be seen from FIG. 27 that, when the program 2700 is called by another program when garbage collection is disabled and the DisableGC count is equal to 1, the program 2700 returns with the same state: in line 2, the DisableGC count is incremented from 1 to 2, and garbage collection remains disabled for the thread; in line 7, the DisableGC count is decremented from 2 to 1, and garbage collection is disabled for the thread; in line 8, the DisableGC count 1 is saved for the thread and a new DisableGC count of zero is set for the thread, enabling garbage collection. In line 13, the original DisableGC count of 1 is restored for the thread, and garbage collection is disabled. Thus, the program 2700 returns to its calling program with the same DisableGC count, 1, as when it was called.

Similarly, if the program 2700 is called with a DisableGC count of zero and garbage collection enabled, it returns with the same DisableGC count: in line 2, the DisableGC count is incremented from zero to 1, disabling garbage collection; in line 7, the DisableGC count is decremented from 1 to zero, enabling garbage collection; in line 8, the DisableGC count zero is saved and replaced with a zero DisableGC count, enabling garbage collection; in line 13, the saved DisableGC count of zero is restored. Thus, the program 2700 returns with a DisableGC count of zero when called with the DisableGC count of zero.

While this invention has been shown and described with reference to preferred embodiments, it will be understood by those skilled in the art that various changes or modifications in form and detail may be made without departing from the scope of the invention. For example, the suspend return technique may be used to suspend execution of a thread at a stable point for purposes other than synchronizing a number of threads with garbage collection a process.

We claim:

1. A method in a computer system for synchronizing the execution of each of a plurality of threads with a garbage collection process, the method comprising the steps of:

for each thread,
before the thread enters a series of instructions that interacts with references to garbage-collected objects, under the control of the thread, calling a first application programming interface (API) for disabling garbage collection if garbage collection is not already in progress, the first API returning immediately if called before garbage collection is initiated and returning only after garbage collection has completed if called after garbage collection is initiated;
before the thread enters a series of instructions that does not interact with references to garbage-collected objects, under the control of the thread, calling a second application programming interface (API) for enabling garbage collection, the second API returning immediately;

in a garbage collection thread, receiving a request to initiate garbage collection;

in response to the request, identifying threads that have enabled garbage collection more recently than they have disabled garbage collection;

after the identifying step, until all threads are identified or suspended,
identifying threads that enable garbage collection, and suspending threads that disable garbage collection; and when all threads are identified or suspended,
performing garbage collection, and
suspending identified threads that disable garbage collection during the performance of garbage collection.

2. A method in a computer system for synchronizing the execution of each of a plurality of threads with a garbage collection process, the method comprising the steps of:

for each thread,
before the thread enters a series of instructions that interacts with references to garbage-collected objects, under the control of the thread, calling a first application programming interface (API) for disabling garbage collection if garbage collection is not already in progress, the first API returning immediately if called before garbage collection is initiated and returning only after garbage collection has completed if called after garbage collection is initiated;
before the thread enters a series of instructions that does not interact with references to garbage-collected objects, under the control of the thread, calling a second application programming interface (API) for enabling garbage collection, the second API returning immediately, such that garbage collection may commence at a time after garbage collection initiation when each thread has either (1) called the second API more recently than it has called the first API or (2) called the first API after garbage collection was initiated, and such that instructions that interact with references to garbage-collected objects are not executed while garbage collection is being performed, while instructions that do not interact with references to garbage-collected objects may be executed while garbage collection is being performed.

3. A computer-readable medium whose contents cause a computer system to synchronize the execution of a thread with a garbage collection process by performing the steps of:

before the thread enters a series of instructions that interacts with references to garbage-collected objects, disabling garbage collection for the thread;

when garbage collection is disabled for the thread, proceeding to execute the series of instructions that interacts with references to garbage-collected objects if garbage collection has not yet been initiated, and deferring execution of the series of instructions that interacts with references to garbage-collected objects if garbage collection has been initiated;

before the thread enters a series of instructions that does not interact with references to garbage-collected objects, enabling garbage collection for the thread; and when garbage collection is enabled for the thread, proceeding to execute the series of instructions that does not interact with references to garbage-collected objects irrespective of whether garbage collection has been initiated, such that garbage collection may commence at a time after garbage collection initiation when either (1) garbage collection has been enabled for the thread more recently than it has been disabled for the thread or (2) garbage collection is disabled for the thread after garbage collection is initiated, and such that instructions that interact with references to garbage-collected objects are not executed while garbage collection is being performed, while instructions that do not interact with references to garbage-collected objects may be executed while garbage collection is being performed.

4. A method in a computer system for synchronizing a garbage collection process with the execution of each of a plurality of threads which may each enable and disable garbage collection, the method comprising the steps of:

receiving a request to initiate garbage collection;

identifying threads that currently have garbage collection enabled;

until all threads are identified or suspended,
identifying threads that enable garbage collection, and suspending threads that disable garbage collection;

when all threads are identified or suspended,
performing garbage collection, and
suspending identified threads that disable garbage collection during the performance of garbage collection; and when garbage collection is completed, unsuspending threads that a resuspended.

5. The method of claim 4, further comprising the steps of:

when a thread enters a code segment that accesses pointers to garbage-collected objects, disabling garbage collection; and when a thread enters a code segment that does not access pointers to garbage-collected objects, enabling garbage collection.

6. The method of claim 5 wherein selected threads are suspendable while they are executing code segments that access pointers to garbage-collected objects, the method further including the step of:

after the identifying step, until all threads are identified or suspended,
suspending any selected threads that last disabled garbage collection before the request was received and have not enabled garbage collection more recently.

7. The method of claim 6 wherein the suspending step suspends one selected thread when this thread executes an instruction occurring in the code being executed by the thread for permitting suspension.

8. The method of claim 6 wherein the suspending step suspends one selected thread when this thread returns from a called routine to a calling routine.

9. The method of claim 4, further comprising the steps of detecting a shortage of memory; and generating the request to initiate garbage collection in response to the detecting step.

10. The method of claim 4, further comprising the step of generating the request to initiate garbage collection at a predetermined time.

11. A computer-readable medium whose contents synchronize a garbage collection process with the execution of a thread by performing the steps of:

receiving a request to initiate garbage collection;

in response to the request, identifying threads that have enabled garbage collection more recently than they have disabled garbage collection;

after the identifying step, until all threads are identified or suspended,
identifying threads that enable garbage collection, and suspending threads that disable garbage collection; and when all threads are identified or suspended,
performing garbage collection, and
suspending identified threads that disable garbage collection during the performance of garbage collection.

12. The computer-readable medium of claim 11 wherein the contents of the computer-readable medium further cause the computer system to perform the steps of:

when a thread enters a code segment that accesses pointers to garbage-collected objects, disabling garbage collection; and when a thread enters a code segment that does not access pointers to garbage-collected objects, enabling garbage collection.

13. The computer-readable medium of claim 11 wherein selected threads are suspendable while they are executing code segments that access pointers to garbage-collected objects, and wherein the contents of the computer-readable medium further cause the computer system to perform the step of:

after the identifying step, until all threads are identified or suspended,
suspending any selected threads that last disabled garbage collection before the request was received and have not enabled garbage collection more recently.

14. The computer-readable medium of claim 13 wherein the suspending step suspends one selected thread when this thread executes an instruction occurring in the code being executed by the thread for permitting suspension.

15. The computer-readable medium of claim 13 wherein the suspending step suspends one selected thread when this thread returns from a called routine to a calling routine.

16. The computer-readable medium of claim 11 wherein the contents of the computer-readable medium further cause the computer system to perform the steps of:
   detecting a shortage of memory; and
   generating the request to initiate garbage collection in response to the detecting step.

17. The computer-readable medium of claim 11 wherein the contents of the computer-readable medium further cause the computer system to perform the step of generating the request to initiate garbage collection at a predetermined time.

18. A method in a computer system for synchronizing an operation with the execution of each of a plurality of threads which may each enable and disable the operation, the method comprising the steps of:
   receiving a request to initiate the operation;
   in response to the request, identifying threads that have enabled the operation more recently than they have disabled the operation;
   after the identifying step, until all threads are identified or suspended,
      identifying threads that enable the operation, and
      suspending threads that disable the operation;
   when all threads are identified or suspended,
      performing the operation, and
      suspending identified threads that disable the operation; and
   when the operation is completed,
      unsuspending threads that are suspended.

19. A computer-readable medium whose contents cause a computer system to synchronize an operation with the execution of each of a plurality of threads which may each enable and disable the operation by performing the steps of:
   receiving a request to initiate the operation;
   in response to the request, identifying threads that have enabled the operation more recently than they have disabled the operation;
   after the identifying step, until all threads are identified or suspended,
      identifying threads that enable the operation, and
      suspending threads that disable the operation; and
   when all threads are identified or suspended,
      performing the operation, and
      suspending identified threads that disable the operation.

20. A method in a computer-based garbage collection system for determining when to initiate garbage collection in a computer program, the computer program having a plurality of thread, the method comprising:
   receiving from each thread indications before it is about to execute GC-safe code and before it is about to execute non-GC-safe code;
   when receiving an indication that a thread is about to execute non-GC-safe code, suspending execution of the thread; and
   when each thread either has most-recently indicated that it is about to execute GC-safe code or is currently suspended, indicating that garbage collection can be initiated, so that threads that are executing GC-safe code are not suspended during garbage collection.

21. The method of claim 20 including the step of, when an indication that a thread is about to execute non-GC-safe code, suspending execution of the thread.

22. A method in a computer system for suspending the execution of a thread when the execution of the thread is in a stable state, the first thread having a stack containing one or more return addresses for pending calls that have been made but that have not returned, the method comprising the steps of:
   in a second thread,
      selecting a return address from among the return addresses contained by the stack for pending calls;
      generating a copy of the selected return address; and
      in the stack, replacing the selected return address with a suspending program address, a suspending program being stored at the suspending program address, the suspending program containing steps for suspending the execution of the first thread and for jumping to the selected return address when the first thread is unsuspended.

23. The method of claim 22 wherein the selecting step selects as the selected return address the return address of the pending call most recently made.

24. The method of claim 22, further comprising the step of performing garbage collection in response to the suspending step.

25. The method of claim 22, further comprising the steps of:
   unsuspending the first thread; and
   in response to the unsuspending step, jumping to the selected return address under the control of the suspending program using the copy of the selected return address.

26. The method of claim 22, further comprising the steps of:
   in the first thread,
      after the step of replacing the selected return address, making an additional call; and
   in the second thread,
      while the additional call is pending, replacing in the stack the return address for the additional call with the suspending program address.

27. The method of claim 26, further comprising the step of:
   in the second thread,
      in conjunction with the step of replacing the return address of the additional call, restoring the selected return address to the stack in its original position.

28. A computer-readable medium whose contents cause a computer system to suspend the execution of a thread when the execution of the thread is in a stable state, the first thread having a stack containing one or more return addresses for pending calls that have been made by that have not returned, by performing the steps of:
   in a second thread,
      selecting a return address from among the return addresses contained by the stack for pending calls;
      generating a copy of the selected return address; and
      in the stack, replacing the selected return address with a suspending program address, a suspending program being stored at the suspending program address, the suspending program containing steps for suspending the execution of the first thread and for jumping to the selected return address when the first thread is unsuspended.

29. The computer-readable medium of claim 28 wherein the selecting step selects as the selected return address the return address of the pending call most recently made.

30. The computer-readable medium of claim 28 wherein the contents of the computer-readable medium further cause the computer system to perform the step of performing garbage collection in response to the suspending step.

31. The computer-readable medium of claim 28 wherein the contents of the computer-readable medium further cause the computer system to perform the steps of:

unsuspending the first thread; and in response to the unsuspending step, jumping to the selected return address under the control of the suspending program using the copy of the selected return address.

32. The computer-readable medium of claim 28 wherein the contents of the computer-readable medium further cause the computer system to perform the steps of:

in the first thread,
after the step of replacing the selected return address, making an additional call; and in the second thread,
while the additional call is pending, in the stack, replacing the return address for the additional call with the suspending program address.

33. The computer-readable medium of claim 32 wherein the contents of the computer-readable medium further cause the computer system to perform the step of:

in the second thread,
in conjunction with the step of replacing the return address of the additional call, restoring the selected return address to the stack in its original position.

34. An apparatus for synchronizing execution of a garbage collection program with the execution of threads in other programs, comprising:

one or more processors that use threads to execute programs including the garbage collection program, some of the programs other than the garbage collection program including code blocks that access object references;

a synchronization agent for the thread executing the garbage collection program that permits the thread executing the garbage collection program to proceed to execute the garbage collection program when no other thread is executing in a code block that accesses object references; and a synchronization agent for the threads executing other programs that permits the threads executing other programs to proceed to execute code blocks that access object references only when the garbage collection program is not being executed.

35. A computer memory containing a garbage collection synchronization data structure for synchronizing a garbage collection process with the execution of each of a plurality of threads, the data structure comprising:

a condition of a first type that is set to a first state when garbage collection is initiated and that is set to a second state when the garbage collection completes; and for each of the plurality of threads, a condition of a second type that is set to a first state when the thread enters code accessing references to garbage-collected objects and that is set to a second state when the thread exits code accessing references to garbage-collected objects, such that each of the plurality of threads may wait for the condition of the first type to be set to the second state before entering code accessing references to garbage-collected objects, and such that the garbage collection process may wait for each of the plurality of conditions of the second type to be set to the second state after garbage collection is initiated and before garbage collection is performed, in order to synchronize the garbage collection process with the execution of the plurality of threads.

36. The computer memory of claim 35 wherein the conditions of the data structure are each events.

* * * * *